US011442257B2

(12) United States Patent
Lin et al.

(10) Patent No.: US 11,442,257 B2
(45) Date of Patent: Sep. 13, 2022

(54) CAMERA MODULE AND ELECTRONIC DEVICE

(71) Applicant: LARGAN PRECISION CO., LTD., Taichung (TW)

(72) Inventors: Cheng-Feng Lin, Taichung (TW); Lin An Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 357 days.

(21) Appl. No.: 16/719,508

(22) Filed: Dec. 18, 2019

(65) Prior Publication Data

US 2021/0080706 A1 Mar. 18, 2021

(30) Foreign Application Priority Data

Sep. 18, 2019 (TW) .................. 108133574

(51) Int. Cl.
*G03B 17/17* (2021.01)
*G02B 17/00* (2006.01)
(Continued)

(52) U.S. Cl.
CPC ........... *G02B 17/008* (2013.01); *G02B 5/003* (2013.01); *G02B 5/208* (2013.01); *G02B 13/02* (2013.01)

(58) Field of Classification Search
CPC ...... G02B 17/008; G02B 5/003; G02B 5/208; G02B 13/02; G02B 13/0065; G02B 23/08;
(Continued)

(56) References Cited

U.S. PATENT DOCUMENTS 6,643,460 B2 11/2003 Uchiyama et al.
9,204,049 B2 12/2015 Nomura et al.
(Continued)

FOREIGN PATENT DOCUMENTS

CN 102981238 A 3/2013
CN 106154520 A 11/2016
(Continued)

OTHER PUBLICATIONS

IN Examination Report in Application No. 202034029961 dated Jun. 2, 2021.
(Continued)

*Primary Examiner* — Balram T Parbadia
(74) *Attorney, Agent, or Firm* — Maschoff Brennan

(57) ABSTRACT

A camera module includes an imaging lens system, an image sensor and a plurality of light-folding elements. The imaging lens system is configured to focus imaging light onto an image surface. The image sensor is disposed on the image surface. The plurality of light-folding elements includes at least one image-side light-folding element disposed on an image side of the imaging lens system, and each of the light-folding elements is configured to fold the imaging light from an entrance optical path thereof to an exit optical path thereof. At least one light-shielding mechanism is arranged on at least one of the entrance light path and the exit light path of the at least one image-side light-folding element. The at least one light-shielding mechanism has a minimal opening, and the minimal opening surrounds the imaging light in the at least one of the entrance optical path and the exit optical path.

24 Claims, 29 Drawing Sheets

(51) Int. Cl.
*G02B 5/20* (2006.01)
*G02B 5/00* (2006.01)
*G02B 13/02* (2006.01)

(58) Field of Classification Search
CPC . G02B 17/00; G02B 5/00; G02B 5/20; G03B 11/00; G03B 17/17
See application file for complete search history.

(56) References Cited

U.S. PATENT DOCUMENTS

| | | | |
|---|---|---|---|
| 9,316,810 | B2 | 4/2016 | Mercado |
| 9,323,030 | B2 | 4/2016 | Nie et al. |
| 9,470,879 | B2 | 10/2016 | Gong |
| 9,946,047 | B2 | 4/2018 | Lin et al. |
| 9,964,759 | B2 | 5/2018 | Lin et al. |
| 9,978,794 | B2 | 5/2018 | Iwafuchi et al. |
| 10,082,649 | B2 | 9/2018 | Park et al. |
| 10,133,037 | B2 | 11/2018 | Chou |
| 10,151,900 | B2 | 12/2018 | Lin et al. |
| 10,215,968 | B2 | 2/2019 | Bae et al. |
| 10,234,659 | B2 | 3/2019 | Yao et al. |
| 10,394,038 | B2 | 8/2019 | Bajorins et al. |
| 2007/0127139 | A1* | 6/2007 | Funahashi ............... G02B 7/10 359/696 |
| 2009/0231537 | A1* | 9/2009 | Yamamiya ............ G03B 17/00 349/200 |
| 2010/0124434 | A1* | 5/2010 | Tatsuno ............... G03G 15/326 399/221 |
| 2011/0304762 | A1 | 12/2011 | Chiu |
| 2013/0278785 | A1* | 10/2013 | Nomura ................ G02B 7/102 348/208.11 |
| 2014/0239206 | A1* | 8/2014 | Namii .................... H04N 5/238 250/558 |
| 2016/0044250 | A1* | 2/2016 | Shabtay ............... H04N 5/2253 348/240.3 |
| 2017/0131526 | A1* | 5/2017 | Park ..................... H04N 5/2252 |
| 2018/0224665 | A1* | 8/2018 | Im ......................... G02B 27/646 |
| 2019/0041554 | A1 | 2/2019 | Shih et al. |
| 2019/0101731 | A1 | 4/2019 | Sekiguchi |
| 2019/0113705 | A1 | 4/2019 | Lin et al. |
| 2019/0196148 | A1* | 6/2019 | Yao ..................... H04N 5/2254 |
| 2021/0080706 | A1 | 3/2021 | Lin et al. |

FOREIGN PATENT DOCUMENTS

| | | |
|---|---|---|
| CN | 206258620 U | 6/2017 |
| CN | 107517285 A | 12/2017 |
| CN | 208636512 U | 3/2019 |
| CN | 210572980 U | 5/2020 |
| TW | 201144888 A | 12/2011 |
| WO | 2008142894 A1 | 11/2008 |

OTHER PUBLICATIONS

CN Office Action in Application No. 201911013300.2 dated Feb. 14, 2022.

* cited by examiner

CAMERA MODULE AND ELECTRONIC DEVICE

RELATED APPLICATIONS

This application claims priority to Taiwan Application 108133574, filed on Sep. 18, 2019, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large in size, thereby unable to meet the requirements of the current technology trends. To achieve compactness, the optical systems may be configured to have a folded optical axis so as to reduce the dimension of the optical systems in a specific direction, thereby reducing the total system size. However, the stray light generated inside the optical systems at the diffraction limit thereof has a significant impact on the imaging quality, which limits the resolution of the optical systems. One way to reduce stray light is to equip a lens assembly with additional optical components to block stray light. However, the additional optical components may increase the overall size of the optical systems such that it is unfavorable for the compactness requirement.

Accordingly, how to improve the optical systems for achieving a compact size and blocking stray light so as to meet the requirement of high-end-specification electronic devices is an important topic in this field nowadays.

SUMMARY

According to one aspect of the present disclosure, a camera module includes an imaging lens system, an image sensor and a plurality of light-folding elements. The imaging lens system is configured to focus imaging light onto an image surface. The image sensor is disposed on the image surface. The plurality of light-folding elements includes at least one image-side light-folding element disposed on an image side of the imaging lens system. Each of the light-folding elements has an entrance optical path and an exit optical path and is configured to fold the imaging light from the entrance optical path thereof to the exit optical path thereof. At least one light-shielding mechanism is arranged on at least one of the entrance light path and the exit light path of the at least one image-side light-folding element. The at least one light-shielding mechanism has a minimal opening, and the minimal opening surrounds the imaging light in the at least one of the entrance optical path and the exit optical path of the at least one image-side light-folding element.

When a maximum diameter of the minimal opening is ϕmax, and a total path length from the imaging lens system to the image sensor is BF, the following condition is satisfied:

$$0.14 < \phi max/BFL < 0.42.$$

According to another aspect of the present disclosure, a camera module includes an imaging lens system, an image sensor and at least one light-folding element. The imaging lens system is configured to focus imaging light onto an image surface. The image sensor is disposed on the image surface. The at least one light-folding element is disposed on an image side of the imaging lens system. The at least one light-folding element has an entrance optical path and an exit optical path, and the at least one light-folding element is configured to fold the imaging light from the entrance optical path thereof to the exit optical path thereof. At least one light-shielding mechanism is arranged on at least one of the entrance optical path and the exit optical path of the at least one light-folding element. The at least one light-shielding mechanism has a minimal opening, and the minimal opening surrounds the imaging light in the at least one of the entrance optical path and the exit optical path of the at least one light-folding element.

When a focal length of the imaging lens system is EFL, the following condition is satisfied:

$$15\ [\text{mm}] < EFL < 40\ [\text{mm}].$$

According to another aspect of the present disclosure, an electronic device includes a driving unit and one of the aforementioned camera modules, wherein the driving unit is disposed on the camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
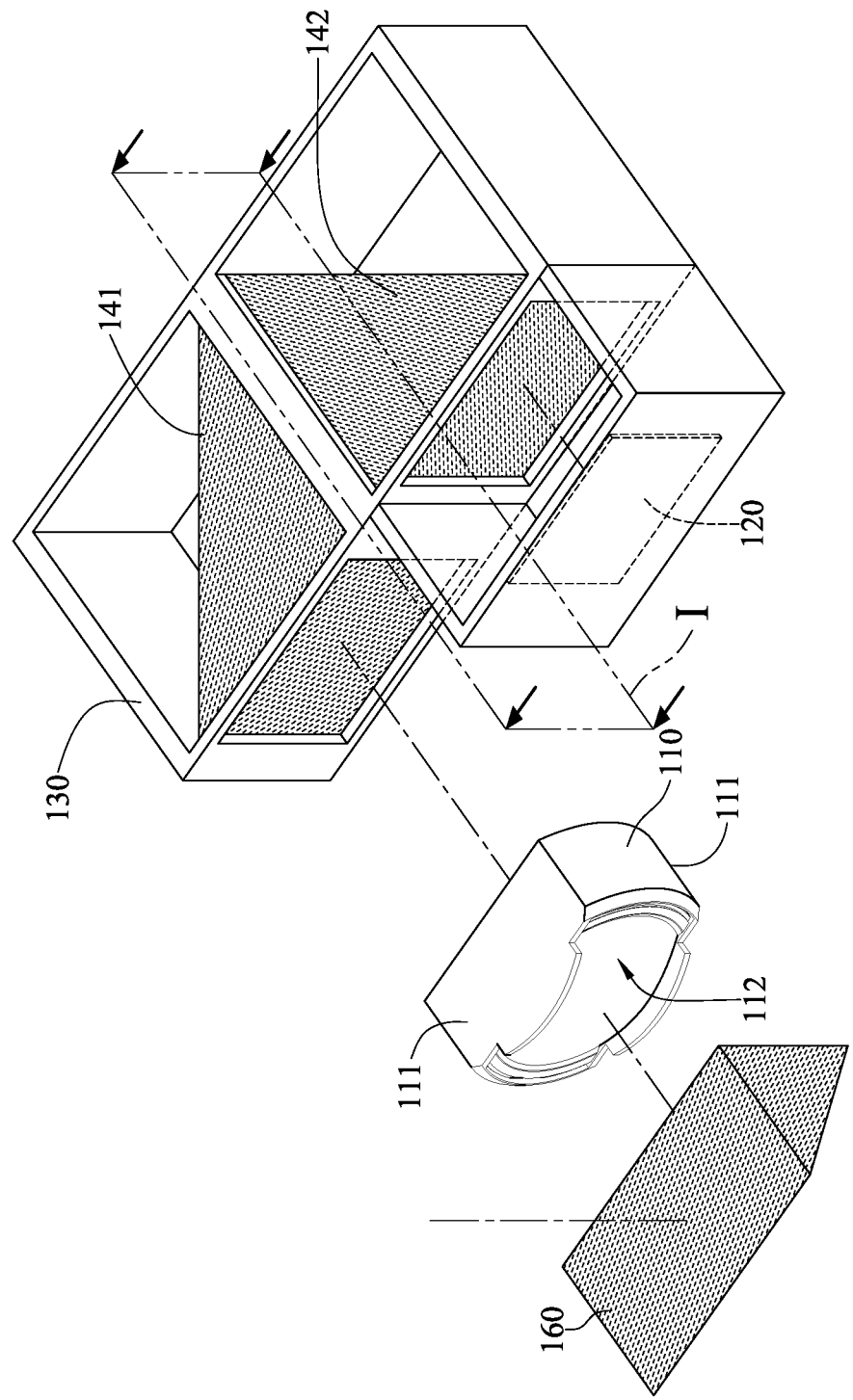
FIG. 1 is one perspective view of a camera module according to the 1st embodiment of the present disclosure.

A camera module of the present disclosure has a configuration of relatively long back focal length for capturing distant landscapes. The camera module includes an imaging lens system, an image sensor and at least one image-side light-folding element. The imaging lens system is configured to focus imaging light onto an image surface, and the image sensor is disposed on the image surface.

The image-side light-folding element is disposed on an image side of the imaging lens system, and the image-side light-folding element has an entrance optical path and an exit optical path and is configured fold the imaging light from the entrance optical path thereof to the exit optical path thereof. Specifically, in one embodiment, the imaging light travels in the entrance optical path to approach the light-folding element, and the imaging light reflected by the light-folding element travels in the exit optical path to be away from the light-folding element. Therefore, it is favorable for reducing the overall module space and effectively utilizing the space by bending imaging light in a way to make the optical path much longer than the size of the optical system, thereby providing the feasibility of a miniaturized lens.

The imaging light is reflected at least once in each light-folding element, and according to various design requirements, each light-folding element can be configured to have its exit optical path being substantially perpendicular or parallel to its entrance optical path. Said "substantially perpendicular" indicates that an angle between the two optical paths can be 90 degrees or near to 90 degrees, and said "substantially parallel" indicates that an angle between the two optical paths can be 0 degrees or neat to 0 degrees. In addition, the light-folding element can be, for example, a triangular prism, a reflection mirror, a pentaprism or a Porro prism, but the present disclosure is not limited thereto.

According to the present disclosure, at least one light-shielding mechanism is arranged on at least one of the entrance optical path and the exit optical path of the image-side light-folding element. The light-shielding mechanism has a minimal opening, and the minimal opening surrounds the imaging light traveling in the optical path where the light-shielding mechanism is located. Therefore, having light-shielding mechanisms arranged on a specific position in the front or back of the light-folding element is favorable for effectively blocking non-imaging light outside the field of view so as to ensure clear images. Moreover, there can be a light-shielding mechanism arranged on each of the entrance optical path and the exit optical path of the image-side light-folding element. Therefore, it is favorable for improving the efficiency of blocking stray light. Moreover, the number of the at least one image-side light-folding element can be at least two, and the at least two image-side light-folding elements can be disposed on the image side of the imaging lens system; the light-shielding mechanism can be located between the at least two image-side light-folding elements and can form a gap between the at least two image-side light-folding elements. Therefore, it is favorable for reducing manufacturing difficulty and increasing design flexibility for assembly; furthermore, it is favorable for improving the efficiency of blocking non-imaging light and even more effectively preventing extra stray light from being generated.

When a maximum diameter of the minimal opening of the light-shielding mechanism is $\phi max$, and a total path length from the imaging lens system to the image sensor is BFL, the following condition can be satisfied: $0.14 < \phi max/BFL < 0.42$. Therefore, it is favorable for ensuring that the imaging lens system has a high resolving power. Moreover, the following condition can also be satisfied: $0.14 < \phi max/BFL < 0.35$. Therefore, it is favorable for providing a high telephoto ratio with high resolving power. Said total path length from the imaging lens system to the image sensor is the back focal length of the imaging lens system. Please refer to FIG. 7, which shows a schematic view of $\phi max$ according to the 1st embodiment of the present disclosure.

When a focal length of the imaging lens system is EFL, the following condition can be satisfied: $15 \text{ [mm]} < EFL < 40 \text{ [mm]}$. Therefore, it is favorable for ensuring the resolving power of the imaging lens system. Moreover, the following condition can also be satisfied: $20 \text{ [mm]} < EFL < 35 \text{ [mm]}$. Therefore, it is favorable for providing a high telephoto ratio with excellent and consistent resolving power.

According to the present disclosure, the camera module can further include at least one object-side light-folding element disposed on an object side of the imaging lens system, and the object-side light-folding element has an entrance optical path being substantially perpendicular to the exit optical path of any one of the image-side light-folding elements. Therefore, it is favorable for providing the feasibility of miniaturized periscope lens.

The imaging lens system can have at least one trimmed structure at a peripheral portion thereof, and the trimmed structure is trimmed down from a periphery towards a center of the imaging lens system. Therefore, it is favorable for properly reducing the size of the imaging lens system in accordance with the length-to-width ratio of the image sensor. Moreover, the number of the at least one trimmed structure can be only one. Moreover, the number of the at least one trimmed structure can be at least two, and the at least two trimmed structures can be on opposite sides of the peripheral portion. Moreover, each of the trimmed structures can form a flat cutting surface.

The image-side light-folding element can be disposed in a holding member, and the holding member allows the imaging light to pass therethrough along the entrance optical path and the exit optical path of the image-side light-folding element. In addition, the light-shielding mechanism can be disposed on the holding member. Therefore, it is favorable for stabilizing the relative position between the light-shielding mechanism and the image-side light-folding element so as to reduce assembly tolerance. When the number of the at least one image-side light-folding element is at least two, there can be at least one image-side light-folding element disposed in the holding member, or there can be at least two image-side light-folding elements disposed in the holding member.

The light-shielding mechanism and the holding member can be one-piece formed, and the light-shielding mechanism can have an anti-reflective surface structure at a periphery of the minimal opening. Therefore, it is favorable for reducing assembly processes so as to increase manufacturing efficiency. Moreover, the light-shielding mechanism and the holding member can be made of, for example, plastic material.

The light-shielding mechanism can include at least one light-shielding member, and a light-absorbing layer can be arranged on the light-shielding member. Therefore, it is favorable for enhancing the light diminishing capability of the light-shielding mechanism and fixing the light-shielding member in position to increase assembly strength. Moreover, the light-shielding member can be, for example, an optical shutter, a metallic spacer, a plastic spacer and a light-absorbing layer, but the present disclosure is not limited thereto. Furthermore, the light-absorbing layer can be a black layer including an adhesive material, which provides adhesion after solidifying. In one configuration, the light-shielding member can be directly abutted with the light-folding element.

The minimal opening of the light-shielding mechanism can be non-circular. When a minimum diameter of the minimal opening is ϕmin, and the maximum diameter of the minimal opening is ϕmax, the following condition can be satisfied: 0.55<ϕmin/ϕmax<0.95. Therefore, it is favorable for reducing non-imaging light generated due to reflection around the minimal opening. Please refer to FIG. 7, which shows a schematic view of ϕmax and ϕmin according to the 1st embodiment of the present disclosure.

According to the present disclosure, the camera module can further include an IR-cut filter, and the light-shielding mechanism and the IR-cut filter can be not in physical contact with each other. Therefore, the design of the light-shielding mechanism may not affect the assembling of the image sensor and the IR-cut filter. Moreover, the IR-cut filter can be closer to the image sensor than the light-shielding mechanism is to the image sensor. Therefore, it is favorable for increasing the efficiency of the light-shielding mechanism for blocking reflection light from the IR-cut filter.

The imaging lens system can have an object-side opening and an image-side opening being both non-circular. Therefore, it is favorable for the imaging lens system to have an opening shape providing an optimized optical quality within limited interior space in accordance with the shape of the image sensor.

When a refractive index of the image-side light-folding element is Nf, the following condition can be satisfied: 1.7<Nf. Therefore, it is favorable for whole amount of imaging light within the field of view of the imaging lens system suffering total internal reflection to be folded from the entrance optical path to the exit optical path.

According to the present disclosure, said total path length from the imaging lens system to image sensor is the back focal length of the imaging lens system, and it is the travelling length of the imaging light in the optical axis from an image-side surface of a most-image-side lens element in the imaging lens system to the image sensor. More specifically, in the embodiment of FIG. 6, the total path length from the imaging lens system 110 to the image sensor 120 includes an axial distance between an image-side surface of a most-image-side lens element in the imaging lens system 110 and a reflection surface of the image-side light-folding element 141, an axial distance between the reflection surface of the image-side light-folding element 141 and a reflection surface of the image-side light-folding element 142, and an axial distance between the reflection surface of the image-side light-folding element 142 and the image sensor 120.

According to the present disclosure, the aforementioned features and conditions can be utilized in numerous combinations so as to achieve corresponding effects According to the above description of the present disclosure, the following specific embodiments are provided for further explanation.

1st Embodiment

Figure 2:
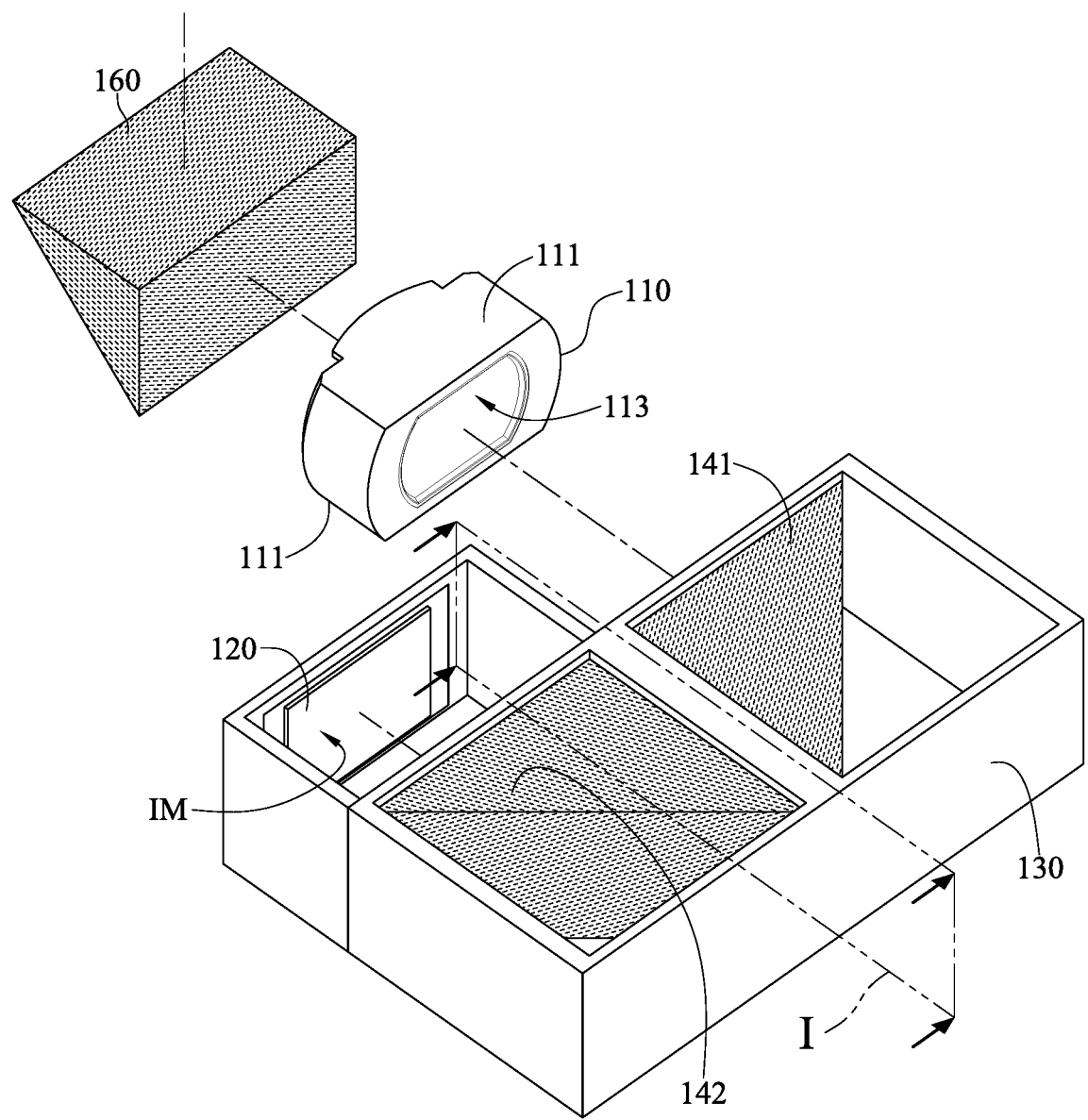
FIG. 2 is another perspective view of the camera module in FIG. 1.
Figure 3:
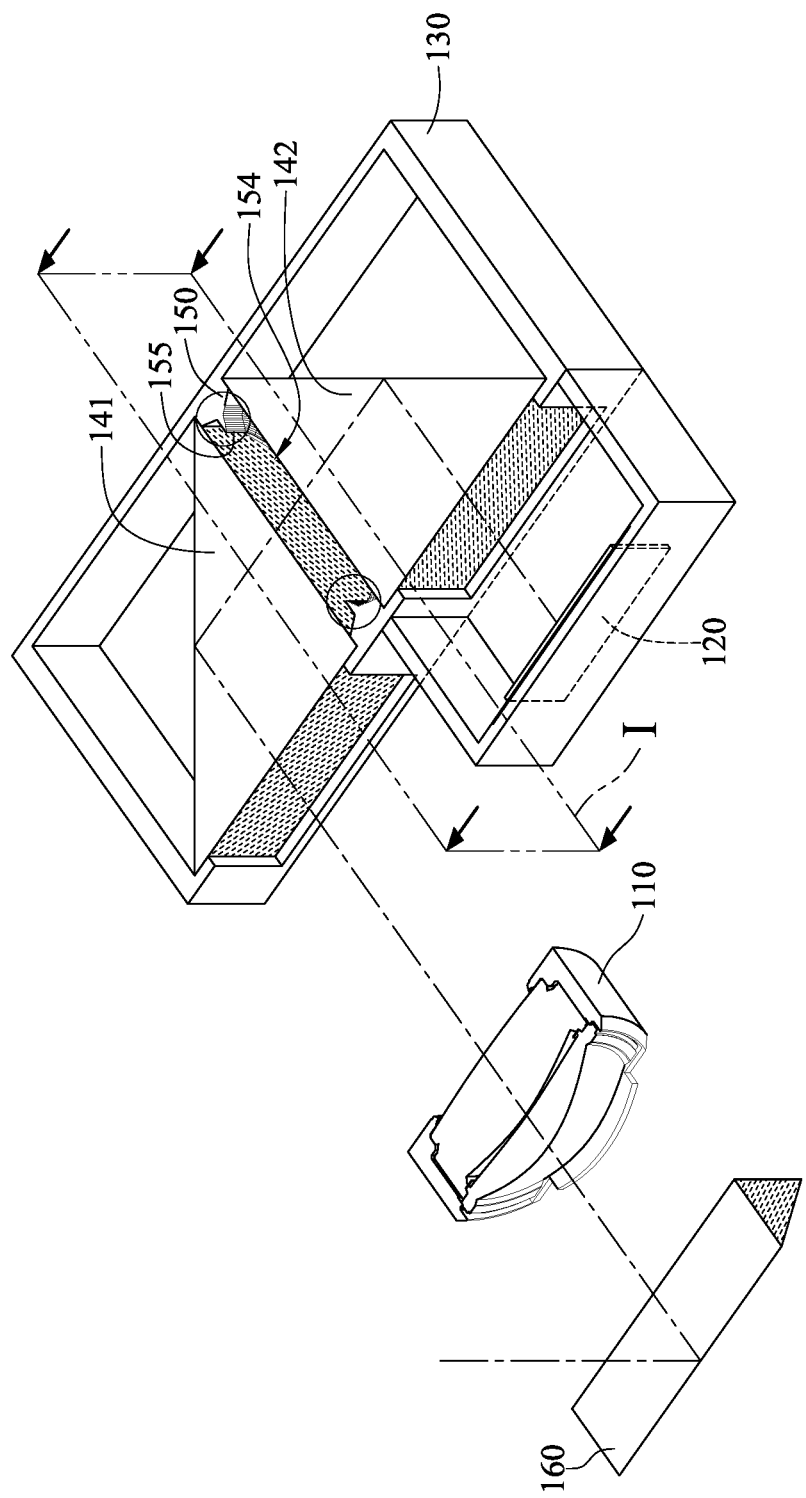
FIG. 3 is a cross-sectional view of the camera module in FIG. 1.
Figure 5:
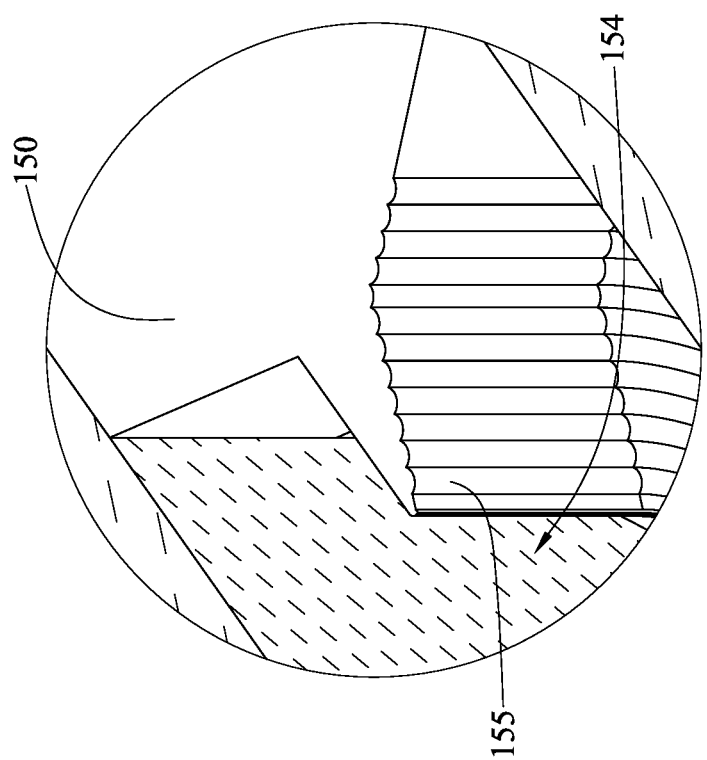
FIG. 4 and FIG. 5 are partial enlarged views of the camera module in FIG. 3.
Figure 4:
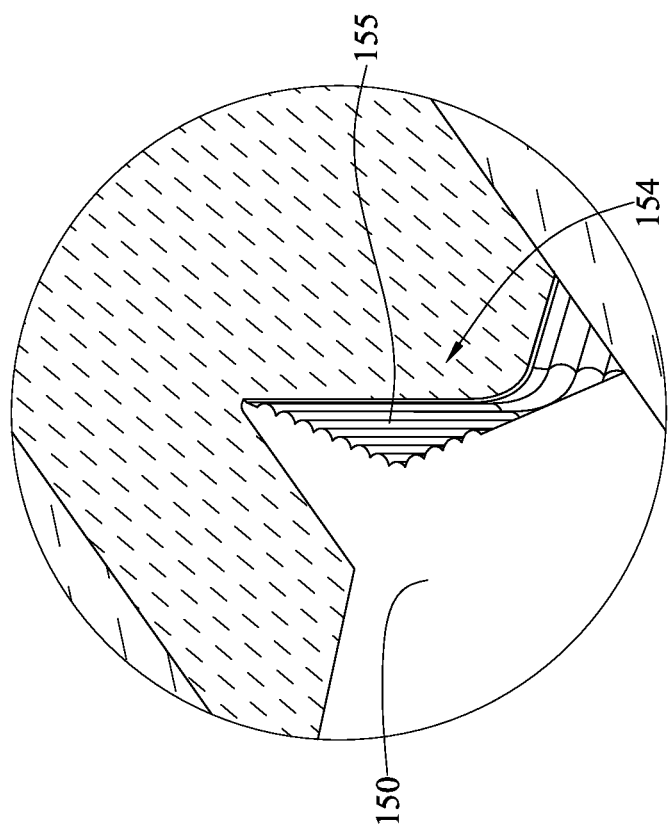
Figure 6:
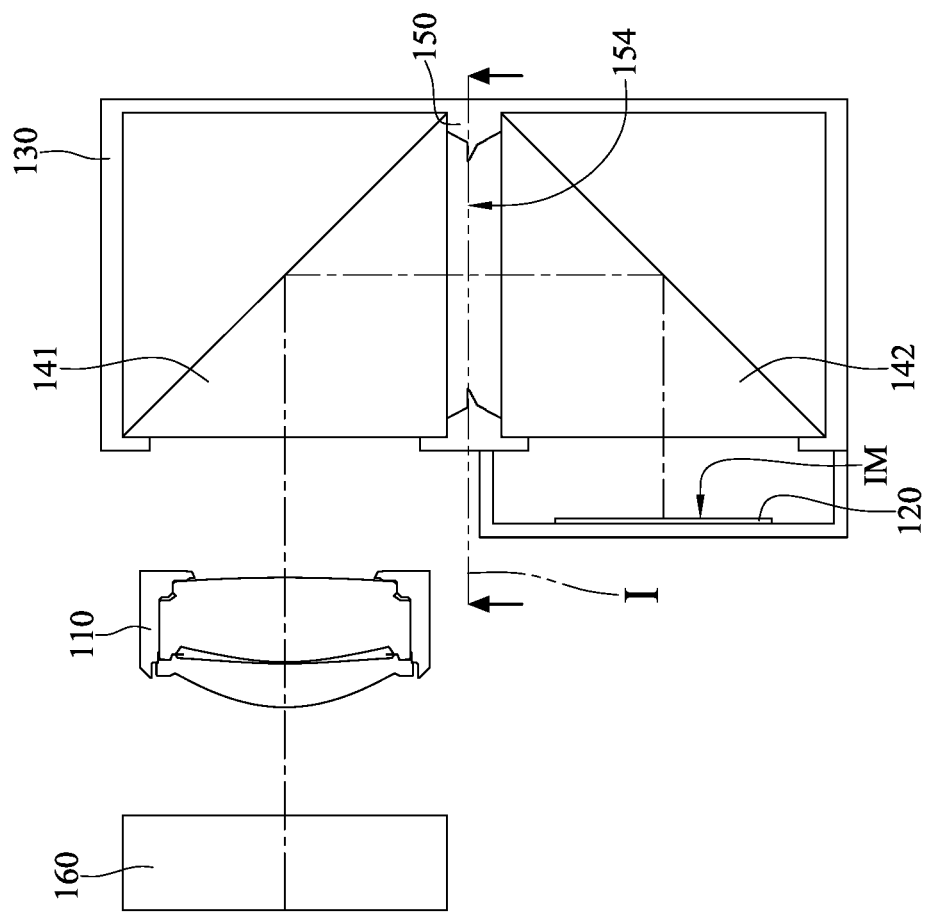
FIG. 6 is a top view of the camera module in FIG. 3.
Figure 7:
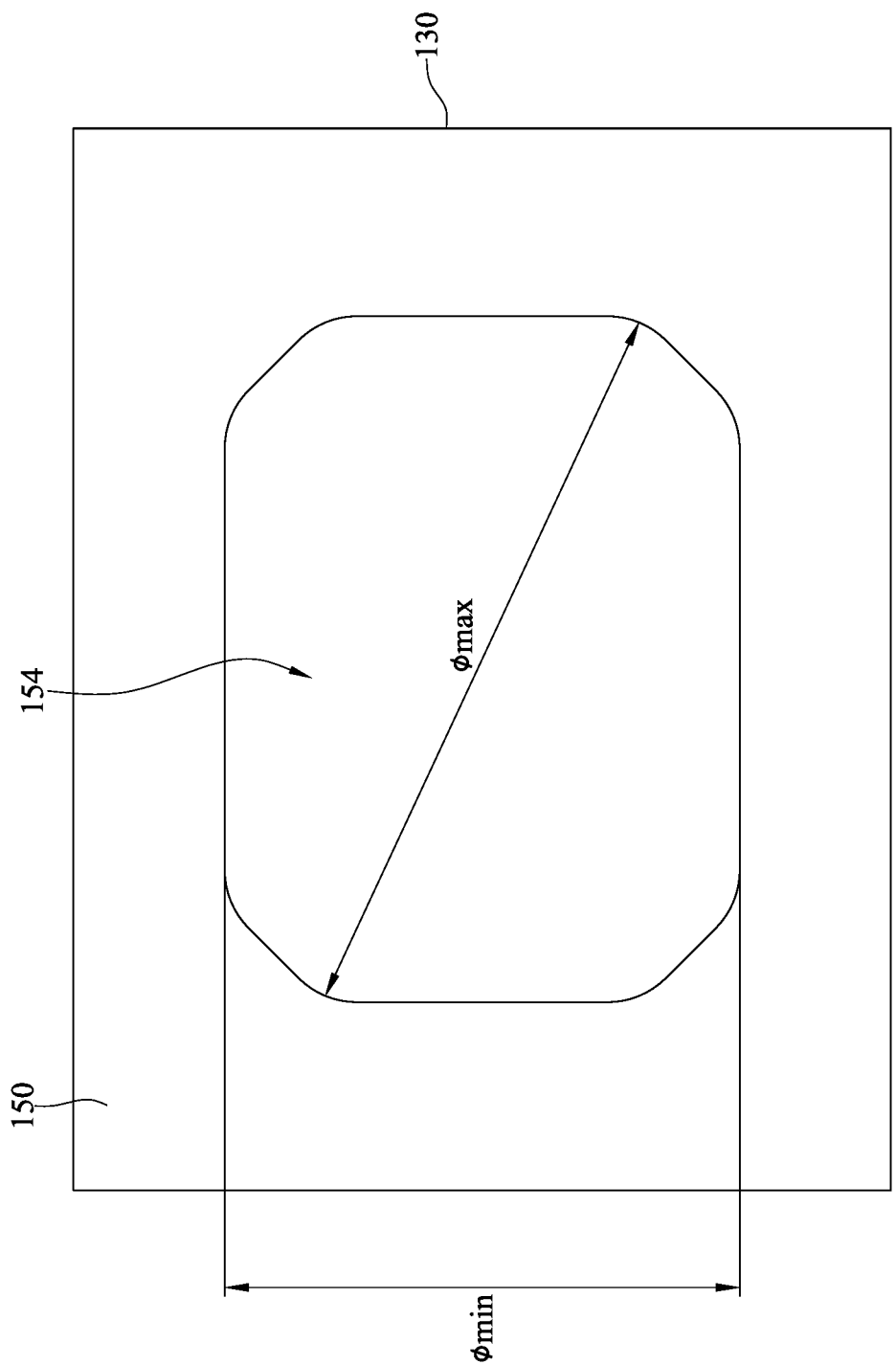
FIG. 7 is a cross-sectional view of a holding member in FIG. 1 along reference plane I.

FIG. 1 is one perspective view of a camera module according to the 1st embodiment of the present disclosure. FIG. 2 is another perspective view of the camera module in FIG. 1. FIG. 3 is a cross-sectional view of the camera module in FIG. 1. FIG. 4 and FIG. 5 are partial enlarged views of the camera module in FIG. 3. FIG. 6 is a top view of the camera module in FIG. 3. FIG. 7 is a cross-sectional view of a holding member in FIG. 1 along reference plane I. In this embodiment, the camera module (its reference numeral is omitted) includes an imaging lens system 110, an image sensor 120, a holding member 130, two image-side light-folding elements 141 and 142, a light-shielding mechanism 150 and an object-side light-folding element 160.

The imaging lens system 110 is configured to focus imaging light onto the image surface IM, and the image sensor 120 is disposed on the image surface IM. In addition, the imaging lens system 110 has two trimmed structures 111 at a peripheral portion thereof. The trimmed structures 111 are on opposite sides of the peripheral portion, and each trimmed structure 111 is trimmed down from a periphery towards a center of the imaging lens system 110 to form a flat cutting surface. Moreover, the imaging lens system 110 has an object-side opening 112 and an image-side opening 113 being both non-circular.

The holding member 130 is disposed on an image side of the imaging lens system 110, and the holding member 130 is located between the imaging lens system 110 and the image surface IM in optical path.

The image-side light-folding elements 141 and 142 are disposed on the image side of the imaging lens system 110, and each of the image-side light-folding elements 141 and 142 is configured to fold the imaging light from an entrance optical path thereof to an exit optical path thereof. In addition, the image-side light-folding element 141 is closer to an object side than the image-side light-folding element 142 is to the object side, and the exit optical path of the image-side light-folding element 141 is also considered as the entrance optical path of the image-side light-folding element 142. Both of the image-side light-folding elements 141 and 142 are disposed in the holding member 130, and the holding member 130 allows the imaging light to pass therethrough along the entrance optical path and the exit optical path of the image-side light-folding elements 141 and 142.

The light-shielding mechanism 150 is disposed on the holding member 130, and the light-shielding mechanism 150 and the holding member 130 are one-piece formed. Furthermore, the light-shielding mechanism 150 is located between the image-side light-folding element 141 and the image-side light-folding element 142, and the light-shielding mechanism 150 forms a gap between the image-side light-folding elements 141 and 142. The light-shielding mechanism 150 being located between the image-side light-folding element 141 and the image-side light-folding element 142 indicates that the light-shielding mechanism 150 is located in the exit optical path of the image-side light-folding element 141 and also located in the entrance optical path of the image-side light-folding element 142. In addition, the light-shielding mechanism 150 has a minimal opening 154, and the minimal opening 154 is non-circular and surrounds the imaging light in the optical path where the light-shielding mechanism 150 is located. As shown in FIG. 4, there is an anti-reflective surface structure 155 arranged at a periphery of the minimal opening 154. The anti-reflective surface structure 155 consists of a plurality of annular protruding structures, and each of the annular protruding structures surrounds the minimal opening 154 and protrudes in the shape of a circular arc.

The object-side light-folding element 160 is disposed on the object side of the imaging lens system 110, and the object-side light-folding element 160 is configured to fold the imaging light from an entrance optical path thereof to an exit optical path thereof. The entrance optical path of the object-side light-folding element 160 is substantially perpendicular to the exit optical path of any one of the image-side light-folding elements 141 and 142. In this embodiment, each of the light-folding elements 141, 142 and 160 is, for example, a triangular prism, and the exit optical path and the entrance optical path of each of the light-folding elements 141, 142 and 160 are substantially perpendicular to each other.

When a maximum diameter of the minimal opening 154 is φmax, and a total path length from the imaging lens system 110 to the image sensor 120 is BFL, the following condition is satisfied: φmax/BFL=0.266.

When a focal length of the imaging lens system 110 is EFL, the following condition is satisfied: EFL=29.5 [mm].

When a minimum diameter of the minimal opening 154 is φmin, and the maximum diameter of the minimal opening 154 is φmax, the following condition is satisfied: φmin/φmax=0.692.

When a refractive index of any one of the image-side light-folding elements 141 and 142 is Nf, the image-side light-folding elements 141 and 142 both satisfy the following condition: Nf=1.77.

2nd Embodiment

Figure 8:
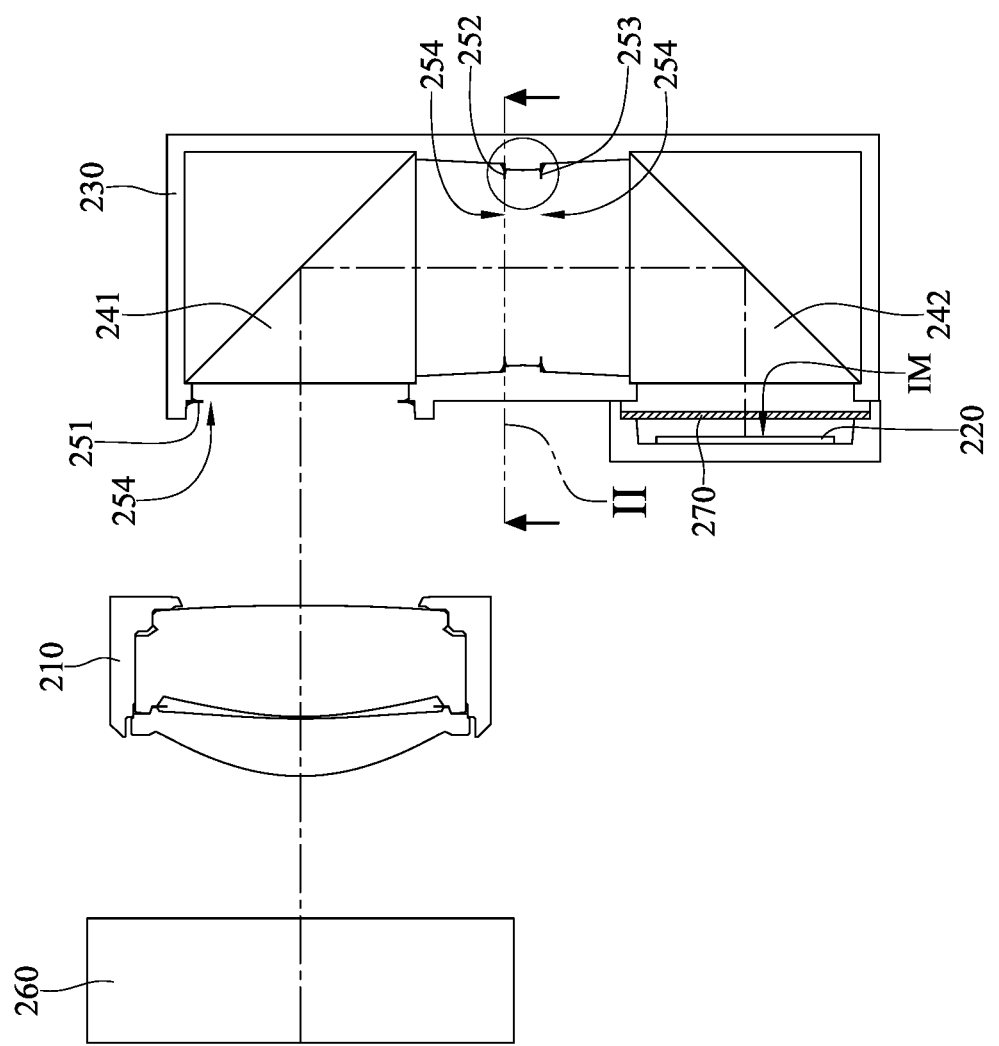
FIG. 8 is a cross-sectional and top view of a camera module according to the 2nd embodiment of the present disclosure.
Figure 9:
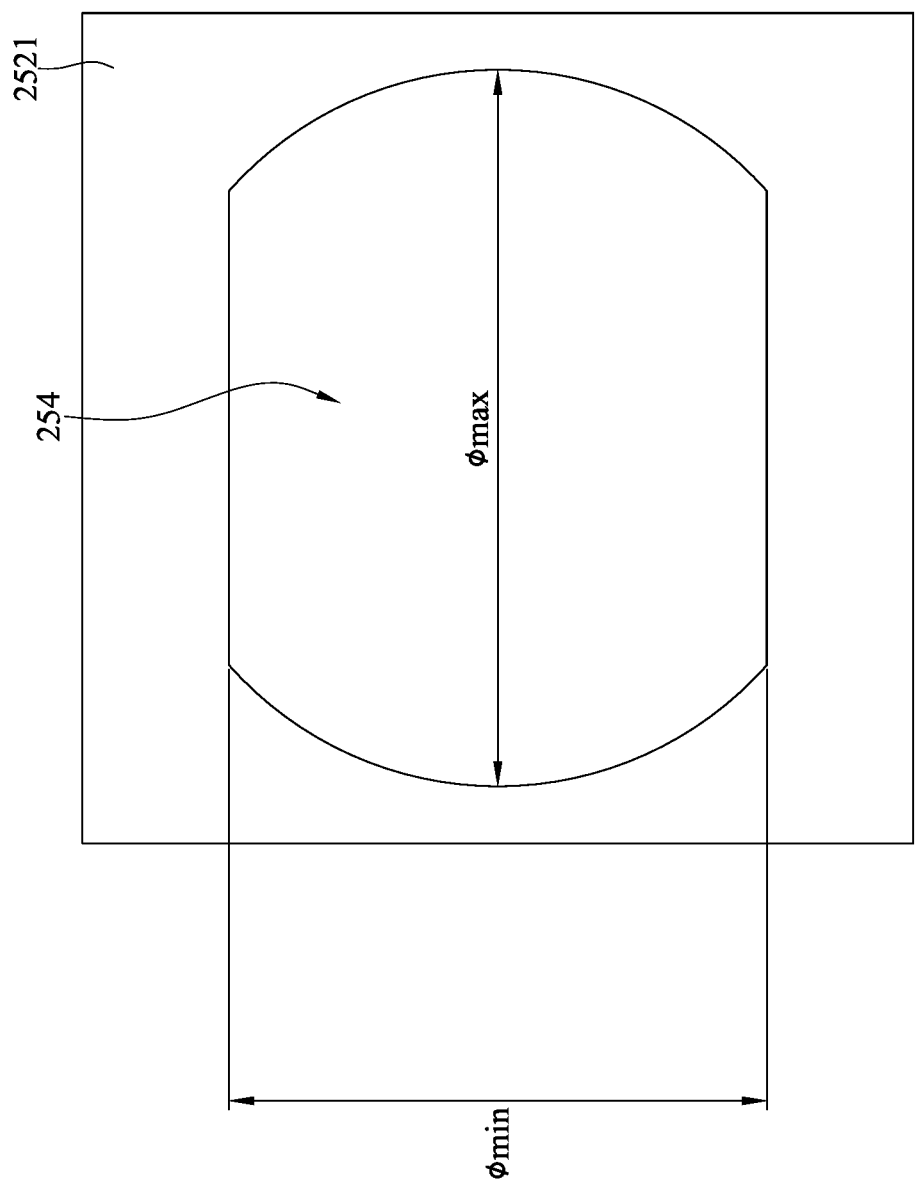
FIG. 9 is a cross-sectional view of a light-shielding member in FIG. 8 along reference plane II.
Figure 10:
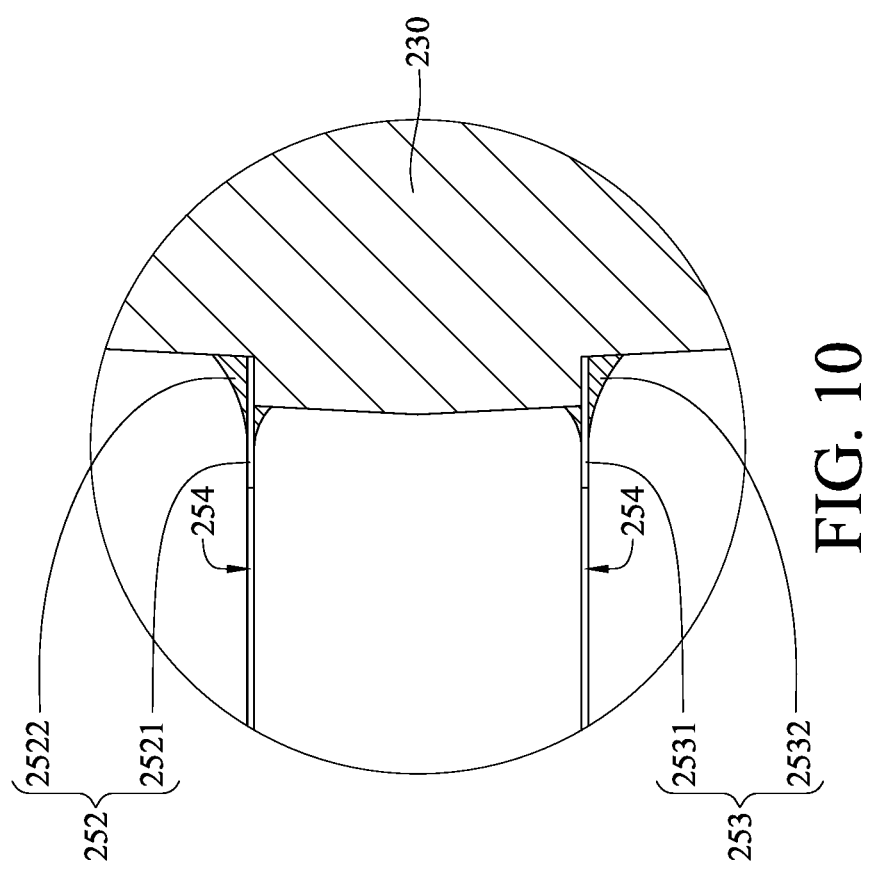
FIG. 10 is a partial enlarged view of the camera module in FIG. 8.

FIG. 8 is a cross-sectional and top view of a camera module according to the 2nd embodiment of the present disclosure. FIG. 9 is a cross-sectional view of a light-shielding member in FIG. 8 along reference plane II. FIG. 10 is a partial enlarged view of the camera module in FIG. 8. In this embodiment, the camera module (its reference numeral is omitted) includes an imaging lens system 210, an image sensor 220, a holding member 230, two image-side light-folding elements 241 and 242, three light-shielding mechanisms 251, 252 and 253, an object-side light-folding element 260 and an IR-cut filter 270.

The imaging lens system 210 is configured to focus imaging light onto the image surface IM, and the image sensor 220 is disposed on the image surface IM. The holding member 230 is disposed on an image side of the imaging lens system 210, and the holding member 230 is located between the imaging lens system 210 and the image surface IM in optical path.

The image-side light-folding elements 241 and 242 are disposed on the image side of the imaging lens system 210, and each of the image-side light-folding elements 241 and 242 is configured to fold the imaging light from an entrance optical path thereof to an exit optical path thereof. In addition, the image-side light-folding element 241 is closer to an object side than the image-side light-folding element 242 is to the object side, and the exit optical path of the image-side light-folding element 241 is also considered as the entrance optical path of the image-side light-folding element 242. Both of the image-side light-folding elements 241 and 242 are disposed in the holding member 230, and the holding member 230 allows the imaging light to pass therethrough along the entrance optical path and the exit optical path of each of the image-side light-folding elements 241 and 242.

The light-shielding mechanisms 251, 252 and 253 are disposed on the holding member 230. In addition, the light-shielding mechanism 251 is located in the entrance optical path of the image-side light-folding element 241, the light-shielding mechanisms 252 and 253 are located between the image-side light-folding element 241 and the image-side light-folding element 242, and the light-shielding mechanisms 252 and 253 jointly form a gap between the image-side light-folding elements 241 and 242. The light-shielding mechanisms 252 and 253 being located between the image-side light-folding element 241 and the image-side light-folding element 242 indicates that the light-shielding mechanisms 252 and 253 are located in the exit optical path of the image-side light-folding element 241 and also located in the entrance optical path of the image-side light-folding element 242. In addition, each of the light-shielding mechanisms 251, 252 and 253 has a minimal opening 254, and the minimal openings 254 are non-circular and each surrounds the imaging light in the optical path where the light-shielding mechanisms 251, 252 and 253 are located, respectively. As shown in FIG. 9 and FIG. 10, the light-shielding mechanism 252 includes a light-shielding member 2521, and the light-shielding mechanism 253 includes a light-shielding member 2531. The minimal openings 254 of the light-shielding mechanisms 252 and 253 are respectively located at the light-shielding members 2521 and 2531, and there are light-absorbing layers 2522 and 2532 respectively arranged on the light-shielding members 2521 and 2531. The light-shielding mechanisms 252 and 253 described above are only exemplary, and the light-shielding mechanism 251 in this embodiment can have a configuration the same as that of the light-shielding mechanisms 252 and 253. In addition, in this embodiment, there are light-shielding mechanisms arranged on both the entrance optical path and the exit optical path of the image-side light-folding element 241.

The object-side light-folding element 260 is disposed on the object side of the imaging lens system 210, and the object-side light-folding element 260 is configured to fold the imaging light from an entrance optical path thereof to an exit optical path thereof. The entrance optical path of the object-side light-folding element 260 is substantially perpendicular to the exit optical path of any one of the image-side light-folding elements 241 and 242. In this embodiment, each of the light-folding elements 241, 242 and 260 is, for example, a triangular prism, and the exit optical path and the entrance optical path of each of the light-folding elements 241, 242 and 260 are substantially perpendicular to each other.

The IR-cut filter 270 is disposed between the image-side light-folding element 242 and the image surface IM, and will not affect the focal length of the camera module. The IR-cut filter 270 is not in physical contact with any one of the light-shielding mechanisms 251, 252 and 253, and the IR-cut filter 270 is closer to the image sensor 220 than the light-shielding mechanisms 251, 252 and 253 are to the image sensor 220.

When a maximum diameter of the minimal opening 254 is ϕmax, and a total path length from the imaging lens system 210 to the image sensor 220 is BFL, the following condition is satisfied: ϕmax/BFL=0.178.

When a focal length of the imaging lens system 210 is EFL, the following condition is satisfied: EFL=28.2 [mm].

When a minimum diameter of the minimal opening 254 is ϕmin, and the maximum diameter of the minimal opening 254 is ϕmax, the following condition is satisfied: ϕmin/ϕmax=0.750.

When a refractive index of any one of the image-side light-folding elements 241 and 242 is Nf, the image-side light-folding elements 241 and 242 both satisfy the following condition: Nf=1.77.

3rd Embodiment

Figure 11:
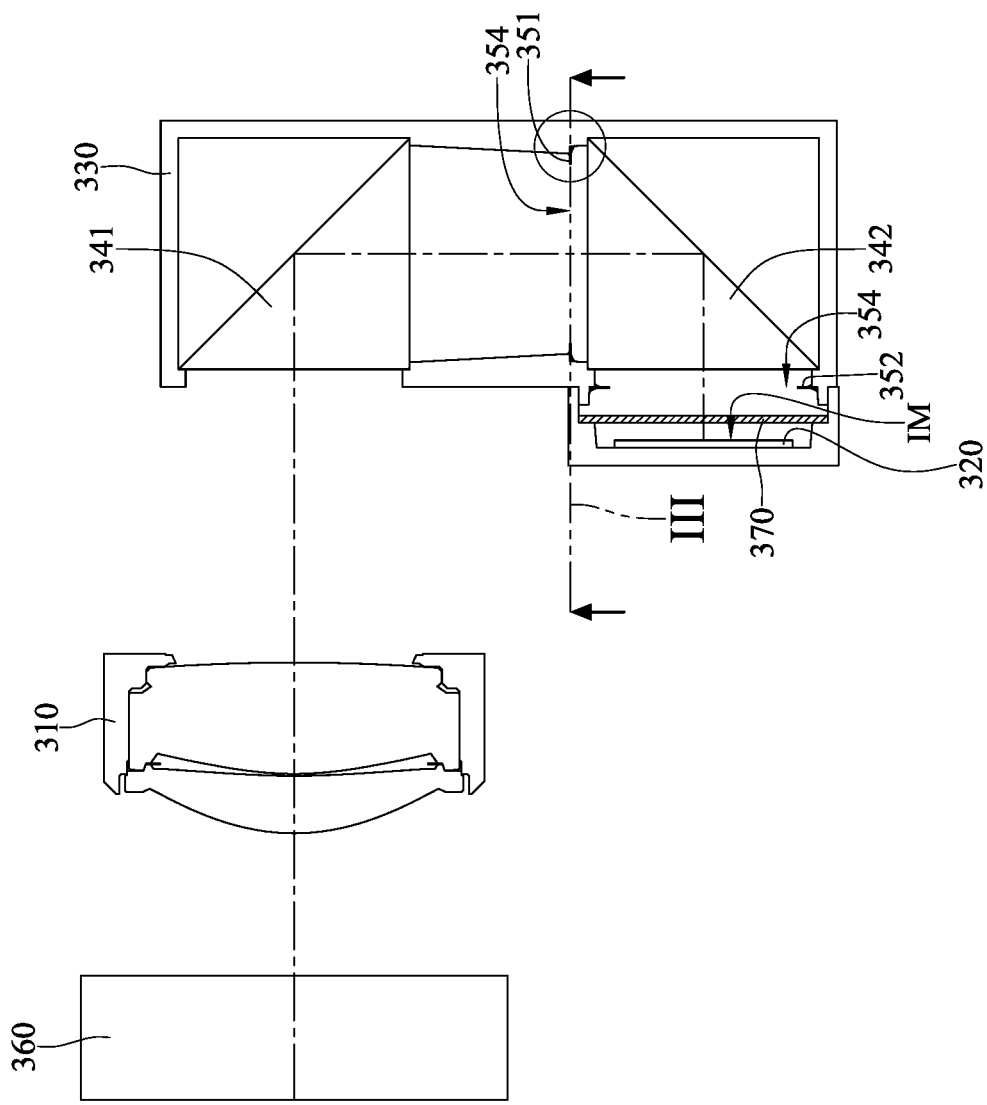
FIG. 11 is a cross-sectional and top view of a camera module according to the 3rd embodiment of the present disclosure.
Figure 12:
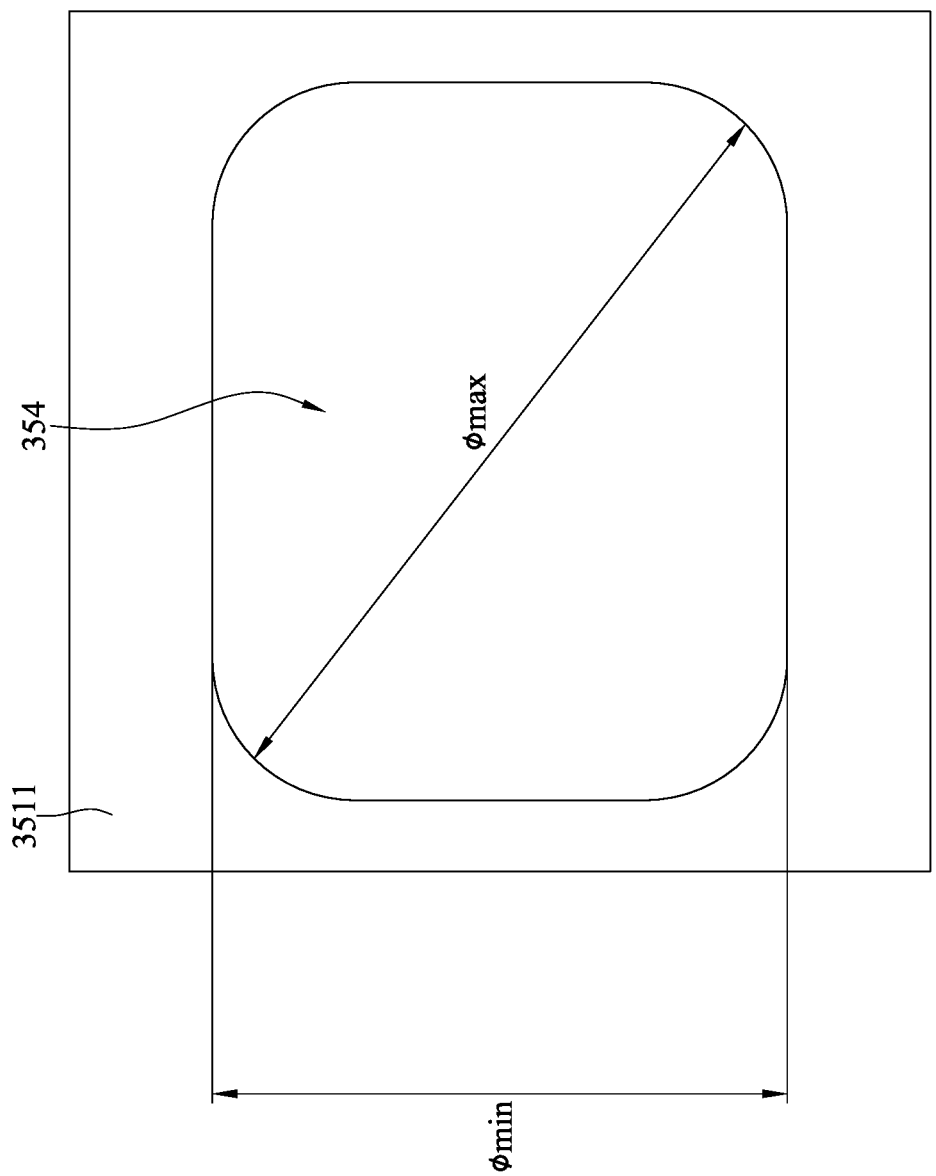
FIG. 12 is a cross-sectional view of a light-shielding member in FIG. 11 along reference plane III.
Figure 13:
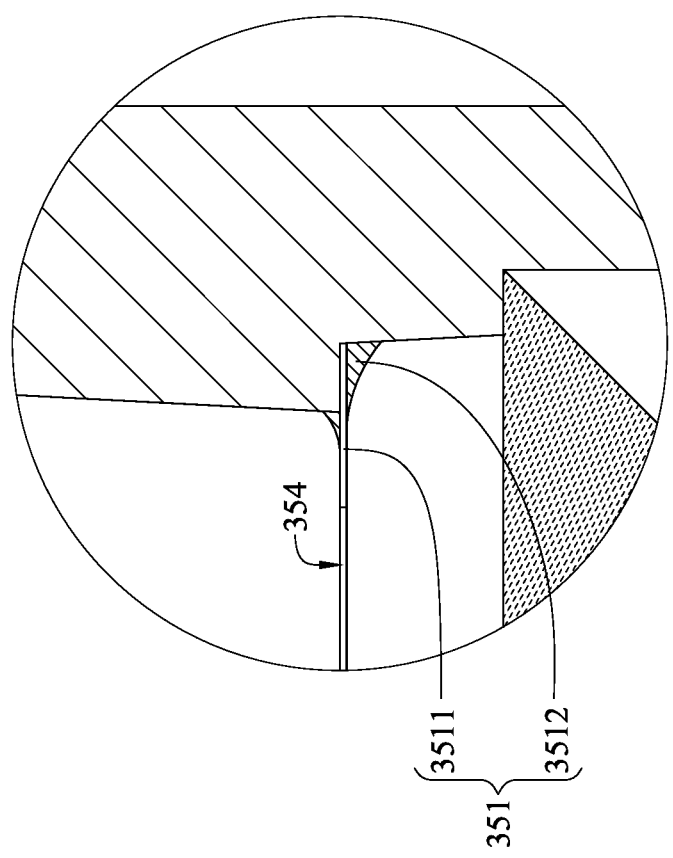
FIG. 13 is a partial enlarged view of the camera module in FIG. 11.

FIG. 11 is a cross-sectional and top view of a camera module according to the 3rd embodiment of the present disclosure. FIG. 12 is a cross-sectional view of a light-shielding member in FIG. 11 along reference plane III. FIG. 13 is a partial enlarged view of the camera module in FIG. 11. In this embodiment, the camera module (its reference numeral is omitted) includes an imaging lens system 310, an image sensor 320, a holding member 330, two image-side light-folding elements 341 and 342, two light-shielding mechanisms 351 and 352, an object-side light-folding element 360 and an IR-cut filter 370.

The imaging lens system 310 is configured to focus imaging light onto the image surface IM, and the image sensor 320 is disposed on the image surface IM. The holding member 330 is disposed on an image side of the imaging lens system 310, and the holding member 330 is located between the imaging lens system 310 and the image surface IM in optical path.

The image-side light-folding elements 341 and 342 are disposed on the image side of the imaging lens system 310, and each of the image-side light-folding elements 341 and 342 is configured to fold the imaging light from an entrance optical path thereof to an exit optical path thereof. In addition, the image-side light-folding element 341 is closer to an object side than the image-side light-folding element 342 is to the object side, and the exit optical path of the image-side light-folding element 341 is also considered as the entrance optical path of the image-side light-folding element 342. The image-side light-folding elements 341 and 342 are disposed in the holding member 330, and the holding member 330 allows the imaging light to pass therethrough along the entrance optical path and the exit optical path of each of the image-side light-folding elements 341 and 342.

The light-shielding mechanisms 351 and 352 are disposed on the holding member 330. In addition, the light-shielding mechanism 351 is located between the image-side light-folding element 341 and the image-side light-folding element 342 and is closer to the image-side light-folding element 342, and the light-shielding mechanism 351 forms a gap between the image-side light-folding elements 341 and 342. The light-shielding mechanism 352 is located in the exit optical path of the image-side light-folding element 342. The light-shielding mechanism 351 being located between the image-side light-folding element 341 and the image-side light-folding element 342 indicates that the light-shielding mechanism 351 is located in the exit optical path of the image-side light-folding element 341 and also located in the entrance optical path of the image-side light-folding element 342. Furthermore, each of the light-shielding mechanisms 351 and 352 has a minimal opening 354, and the minimal openings 354 are non-circular and each surrounds the imaging light in the optical path where the light-shielding mechanisms 351 and 352 are located, respectively. As shown in FIG. 12 and FIG. 13, the light-shielding mechanism 351 includes a light-shielding member 3511, the minimal opening 354 of the light-shielding mechanism 351 is located at the light-shielding member 3511, and there is a light-absorbing layer 3512 arranged on the light-shielding member 3511. The light-shielding mechanism 351 described above is only exemplary, and the light-shielding mechanism 352 in this embodiment can have a configuration the same as that of the light-shielding mechanism 351. In addition, in this embodiment, there are light-shielding mechanisms arranged on both the entrance optical path and the exit optical path of the image-side light-folding element 342.

The object-side light-folding element 360 is disposed on the object side of the imaging lens system 310, and the object-side light-folding element 360 is configured to fold the imaging light from an entrance optical path thereof to an exit optical path thereof. The entrance optical path of the object-side light-folding element 360 is substantially perpendicular to the exit optical path of any one of the image-side light-folding elements 341 and 342. In this embodiment, each of the light-folding elements 341, 342 and 360 is, for example, a triangular prism, and the exit optical path and the entrance optical path of each of the light-folding elements 341, 342 and 360 are substantially perpendicular to each other.

The IR-cut filter 370 is disposed between the image-side light-folding element 342 and the image surface IM, and will not affect the focal length of the camera module. The IR-cut filter 370 is not in physical contact with any one of the light-shielding mechanisms 351 and 352, and the IR-cut filter 370 is closer to the image sensor 320 than the light-shielding mechanisms 351 and 352 are to the image sensor 320.

When a maximum diameter of the minimal opening 354 is ϕmax, and a total path length from the imaging lens system 310 to the image sensor 320 is BFL, the following condition is satisfied: ϕmax/BFL=0.200.

When a focal length of the imaging lens system 310 is EFL, the following condition is satisfied: EFL=26.9 [mm].

When a minimum diameter of the minimal opening 354 is φmin, and the maximum diameter of the minimal opening 354 is φmax, the following condition is satisfied: φmin/φmax=0.713.

When a refractive index of any one of the image-side light-folding elements 341 and 342 is Nf, the image-side light-folding elements 341 and 342 both satisfy the following condition: Nf=2.02.

4th Embodiment

Figure 14:
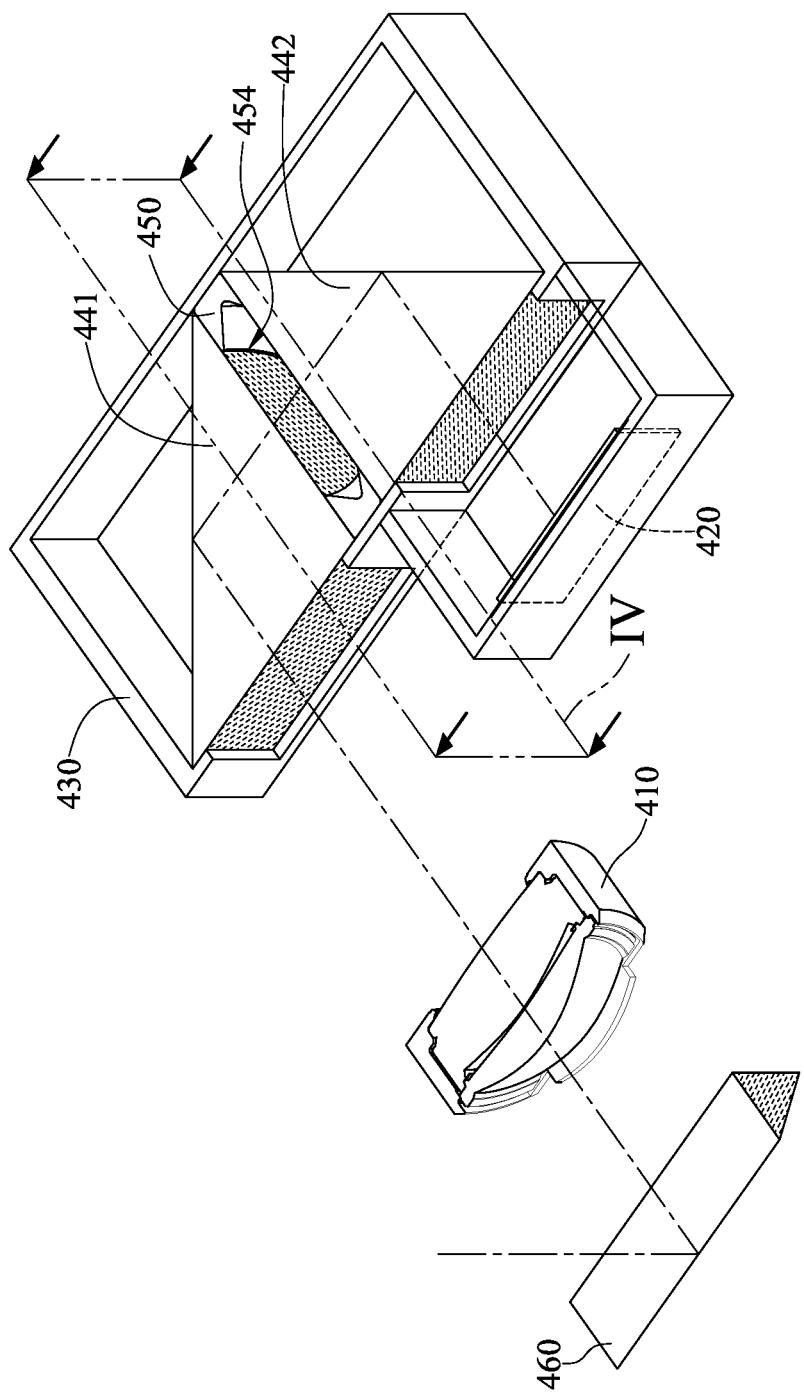
FIG. 14 is a cross-sectional view of a camera module according to the 4th embodiment of the present disclosure.
Figure 15:
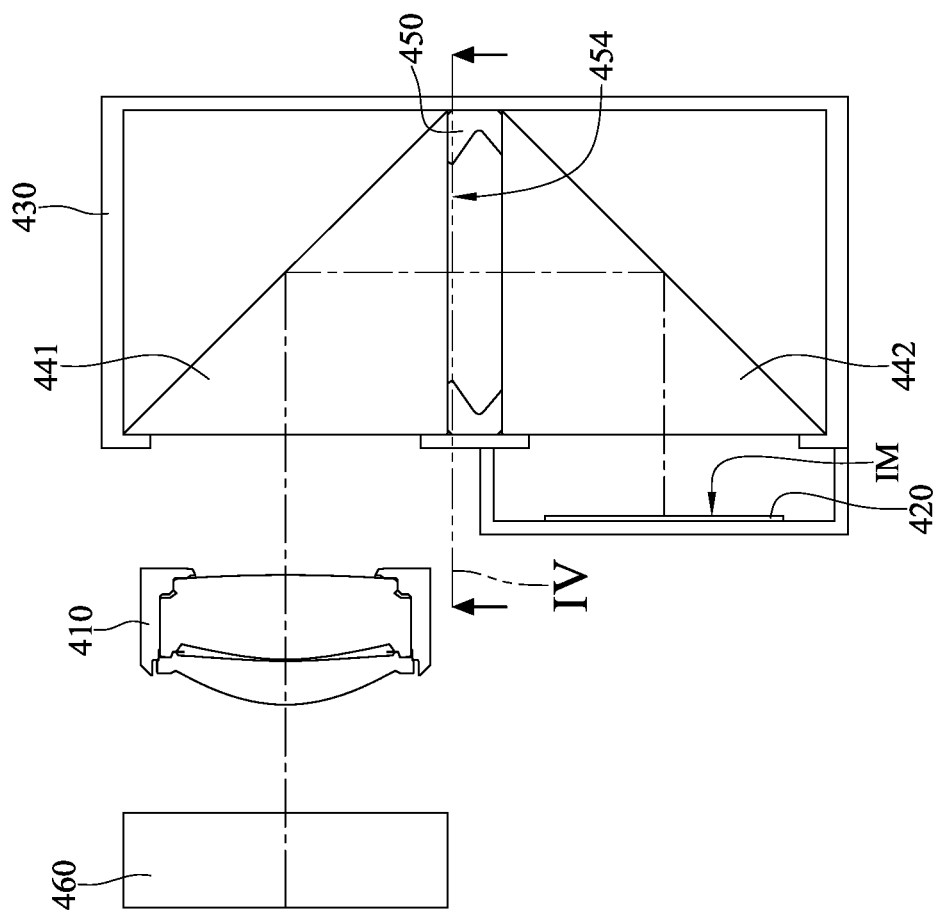
FIG. 15 is a top view of the camera module in FIG. 14.
Figure 16:
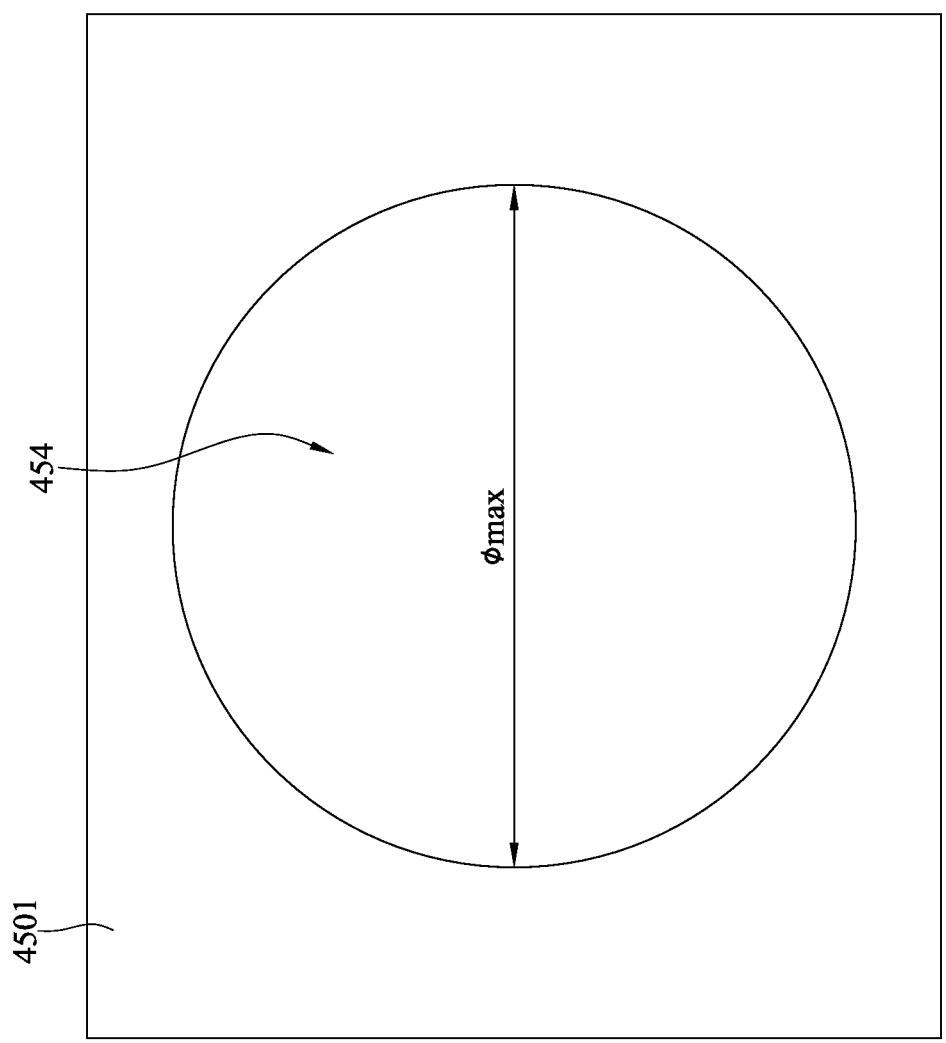
FIG. 16 is a cross-sectional view of a light-shielding member in FIG. 14 along reference plane IV.

FIG. 14 is a cross-sectional view of a camera module according to the 4th embodiment of the present disclosure. FIG. 15 is a top view of the camera module in FIG. 14. FIG. 16 is a cross-sectional view of a light-shielding member in FIG. 14 along reference plane IV. In this embodiment, the camera module (its reference numeral is omitted) includes an imaging lens system 410, an image sensor 420, a holding member 430, two image-side light-folding elements 441 and 442, a light-shielding mechanism 450 and an object-side light-folding element 460.

The imaging lens system 410 is configured to focus imaging light onto the image surface IM, and the image sensor 420 is disposed on the image surface IM.

The holding member 430 is disposed on an image side of the imaging lens system 410, and the holding member 430 is located between the imaging lens system 410 and the image surface IM in optical path.

The image-side light-folding elements 441 and 442 are disposed on the image side of the imaging lens system 410, and each of the image-side light-folding elements 441 and 442 is configured to fold the imaging light from an entrance optical path thereof to an exit optical path thereof. In addition, the image-side light-folding element 441 is closer to an object side than the image-side light-folding element 442 is to the object side, and the exit optical path of the image-side light-folding element 441 is also considered as the entrance optical path of the image-side light-folding element 442. The image-side light-folding elements 441 and 442 are disposed in the holding member 430, and the holding member 430 allows the imaging light to pass therethrough along the entrance optical path and the exit optical path of each of the image-side light-folding elements 441 and 442.

The light-shielding mechanism 450 is disposed on the holding member 430. In addition, the light-shielding mechanism 450 is located between the image-side light-folding element 441 and the image-side light-folding element 442, and the light-shielding mechanism 450 forms a gap between the image-side light-folding elements 441 and 442. The light-shielding mechanism 451 being located between the image-side light-folding element 441 and the image-side light-folding element 442 indicates that the light-shielding mechanism 451 is located in the exit optical path of the image-side light-folding element 441 and also located in the entrance optical path of the image-side light-folding element 442. Furthermore, the light-shielding mechanism 450 has a minimal opening 454, and the minimal opening 454 is circular and surrounds the imaging light in the optical path where the light-shielding mechanism 450 is located. As shown in FIG. 15 and FIG. 16, the light-shielding mechanism 450 includes a light-shielding member 4501, and the minimal opening 454 of the light-shielding mechanism 450 is located at the light-shielding member 4501. The minimal opening 454 is located between the image-side light-folding elements 441 and 442 and is closer to the image-side light-folding element 441.

The object-side light-folding element 460 is disposed on the object side of the imaging lens system 410, and the object-side light-folding element 460 is configured to fold the imaging light from an entrance optical path thereof to an exit optical path thereof. The entrance optical path of the object-side light-folding element 460 is substantially perpendicular to the exit optical path of any one of the image-side light-folding elements 441 and 442. In this embodiment, each of the light-folding elements 441, 442 and 460 is, for example, a triangular prism, and the exit optical path and the entrance optical path of each of the light-folding elements 441, 442 and 460 are substantially perpendicular to each other.

When a maximum diameter of the minimal opening 454 is φmax, and a total path length from the imaging lens system 410 to the image sensor 420 is BFL, the following condition is satisfied: φmax/BFL=0.234. In this embodiment, the minimal opening 454 is circular, and the maximum diameter of the minimal opening 454 is equal to the diameter of the minimal opening 454.

When a focal length of the imaging lens system 410 is EFL, the following condition is satisfied: EFL=29.5 [mm].

When a minimum diameter of the minimal opening 454 is φmin, and the maximum diameter of the minimal opening 454 is φmax, the following condition is satisfied: φmin/φmax=1. In this embodiment, the minimal opening 454 is circular, and the minimum diameter and the maximum diameter of the minimal opening 454 are the same.

When a refractive index of any one of the image-side light-folding elements 441 and 442 is Nf, the image-side light-folding elements 441 and 442 both satisfy the following condition: Nf=1.77.

5th Embodiment

Figure 17:
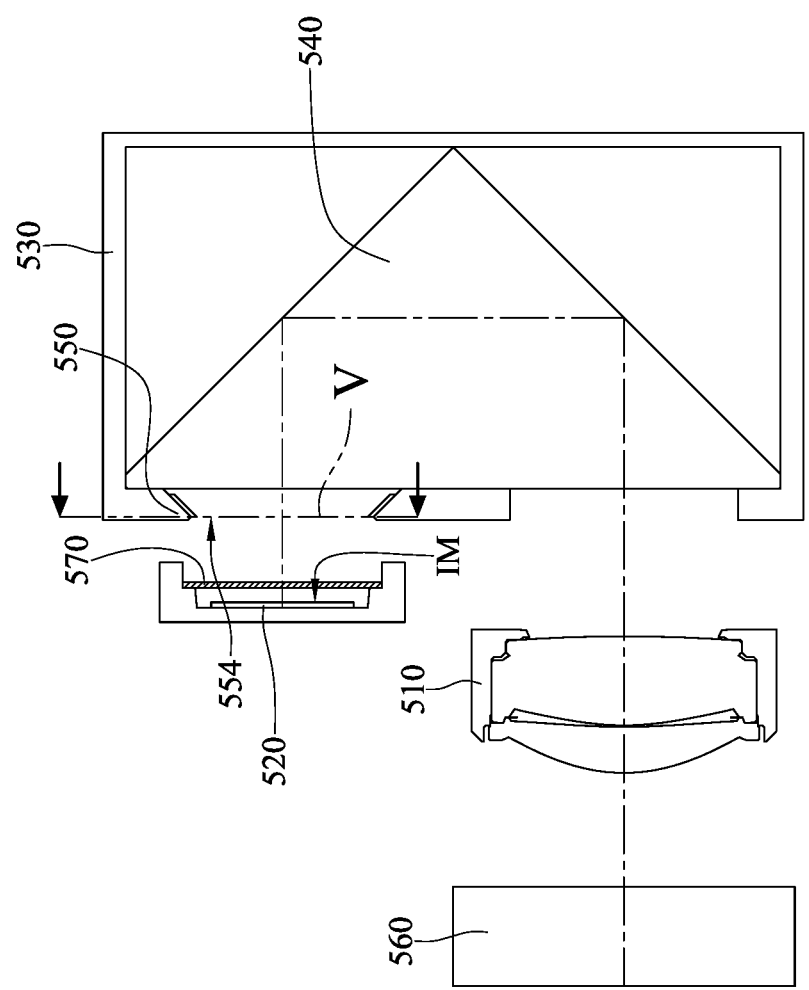
FIG. 17 is a cross-sectional and top view of a camera module according to the 5th embodiment of the present disclosure.
Figure 18:
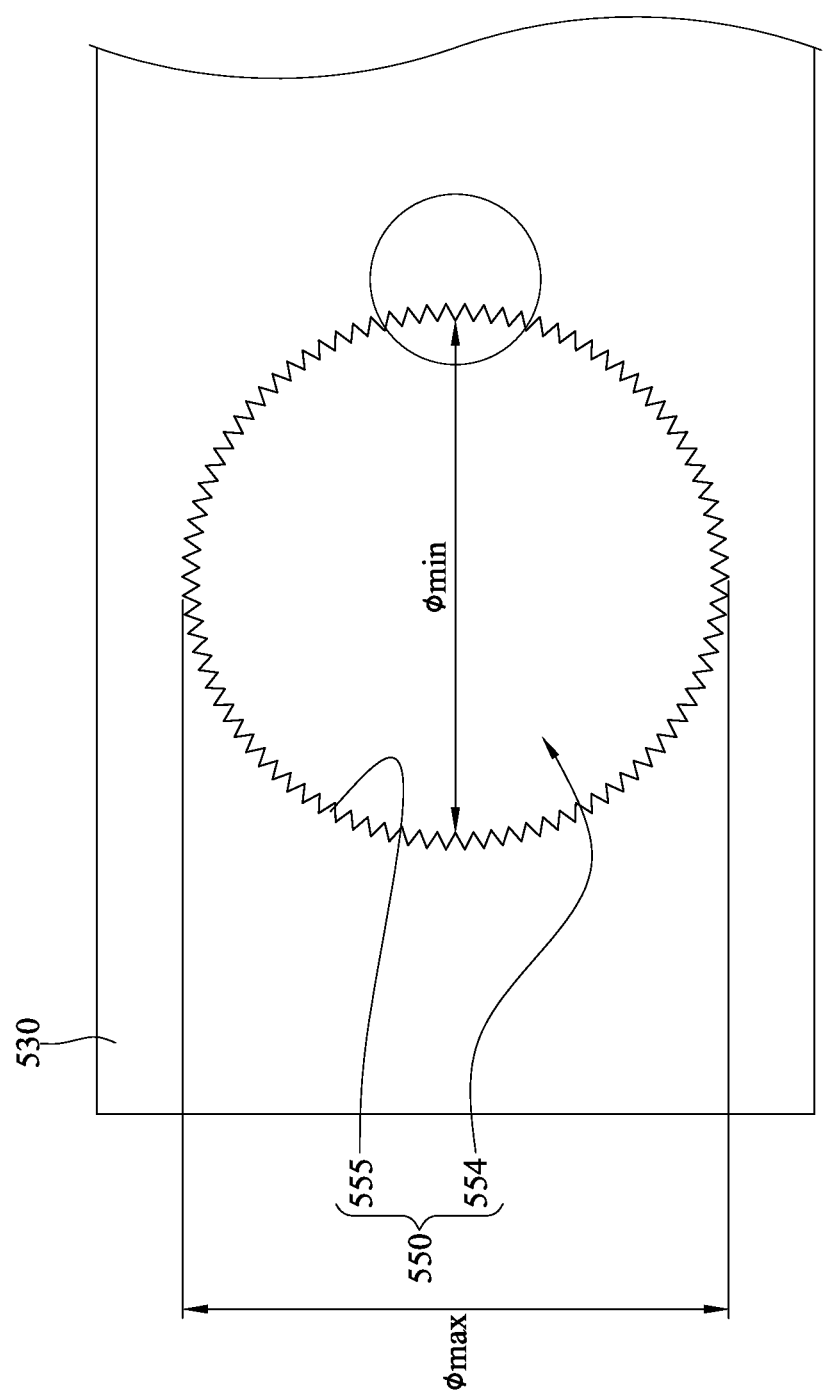
FIG. 18 is a cross-sectional view of a holding member in FIG. 17 along reference plane V.
Figure 19:
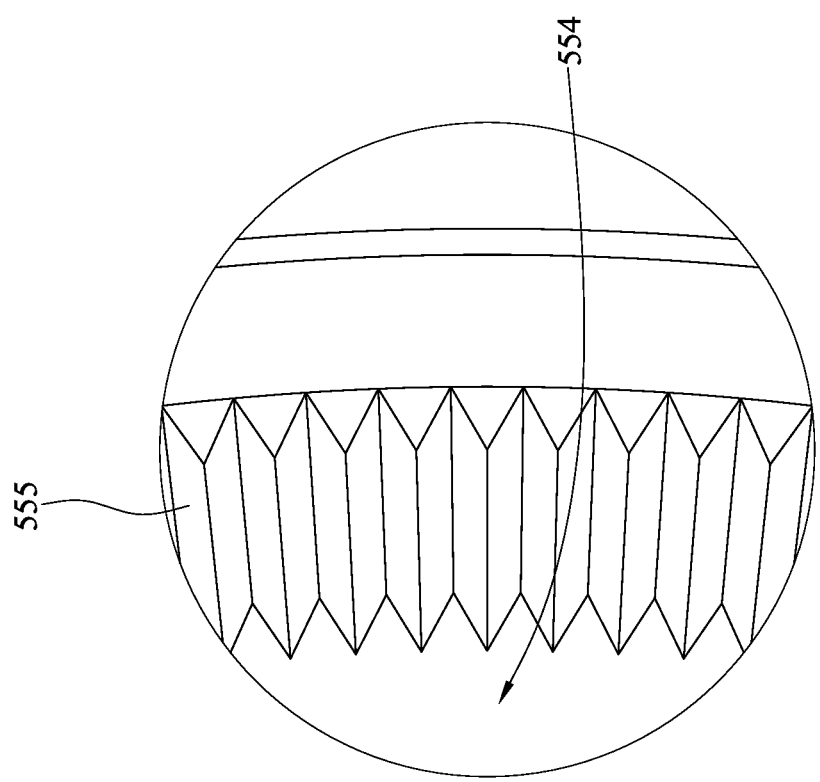
FIG. 19 is a partial enlarged view of the holding member in FIG. 18.

FIG. 17 is a cross-sectional and top view of a camera module according to the 5th embodiment of the present disclosure. FIG. 18 is a cross-sectional view of a holding member in FIG. 17 along reference plane V. FIG. 19 is a partial enlarged view of the holding member in FIG. 18. In this embodiment, the camera module (its reference numeral is omitted) includes an imaging lens system 510, an image sensor 520, a holding member 530, an image-side light-folding element 540, a light-shielding mechanism 550, an object-side light-folding element 560 and an IR-cut filter 570.

The imaging lens system 510 is configured to focus imaging light onto the image surface IM, and the image sensor 520 is disposed on the image surface IM.

The holding member 530 is disposed on an image side of the imaging lens system 510, and the holding member 530 is located between the imaging lens system 510 and the image surface IM in optical path.

The image-side light-folding element 540 is disposed on the image side of the imaging lens system 510, and the image-side light-folding element 540 is configured to fold the imaging light from an entrance optical path thereof to an exit optical path thereof. In addition, the imaging light is reflected twice in the image-side light-folding element 540, and the exit optical path and the entrance optical path of the image-side light-folding element 540 are substantially parallel to each other. The image-side light-folding element 540 is disposed in the holding member 530, and the holding member 530 allows the imaging light to pass therethrough along the entrance optical path and the exit optical path of the image-side light-folding element 540. In this embodiment, the image-side light-folding element 540 is, for example, a Porro prism.

The light-shielding mechanism 550 is disposed on the holding member 530, and the light-shielding mechanism 550 and the holding member 530 are one-piece formed. Furthermore, the light-shielding mechanism 550 is located between the image-side light-folding element 540 and the image surface IM. In addition, the light-shielding mechanism 550 has a minimal opening 554, and the minimal opening 554 is non-circular and surrounds the imaging light in the optical path where the light-shielding mechanism 550 is located. As shown in FIG. 18 and FIG. 19, there is an anti-reflective surface structure 555 arranged at a periphery of the minimal opening 554. The anti-reflective surface structure 555 consists of a plurality of wedge strip structures, and the wedge strip structures are arranged in order along a circumferential direction around the periphery of the minimal opening 554.

The object-side light-folding element 560 is disposed on an object side of the imaging lens system 510, and the object-side light-folding element 560 is configured to fold the imaging light from an entrance optical path thereof to an exit optical path thereof. The entrance optical path of the object-side light-folding element 560 is substantially perpendicular to the exit optical path of the image-side light-folding element 540. In this embodiment, the object-side light-folding element 560 is, for example, a triangular prism, and the exit optical path and the entrance optical path of the object-side light-folding element 560 are substantially perpendicular to each other.

The IR-cut filter 570 is disposed between the image-side light-folding element 540 and the image surface IM, and will not affect the focal length of the camera module. The IR-cut filter 570 is not in physical contact with the light-shielding mechanism 550, and the IR-cut filter 570 is closer to the image sensor 520 than the light-shielding mechanism 550 is to the image sensor 520.

When a maximum diameter of the minimal opening 554 is ϕmax, and a total path length from the imaging lens system 510 to the image sensor 520 is BFL, the following condition is satisfied: ϕmax/BFL=0.192.

When a focal length of the imaging lens system 510 is EFL, the following condition is satisfied: EFL=28.2 [mm].

When a minimum diameter of the minimal opening 554 is ϕmin, and the maximum diameter of the minimal opening 554 is ϕmax, the following condition is satisfied: ϕmin/ϕmax=0.938.

When a refractive index of the image-side light-folding element 540 is Nf, the following condition is satisfied: Nf=1.77.

6th Embodiment

Figure 20:
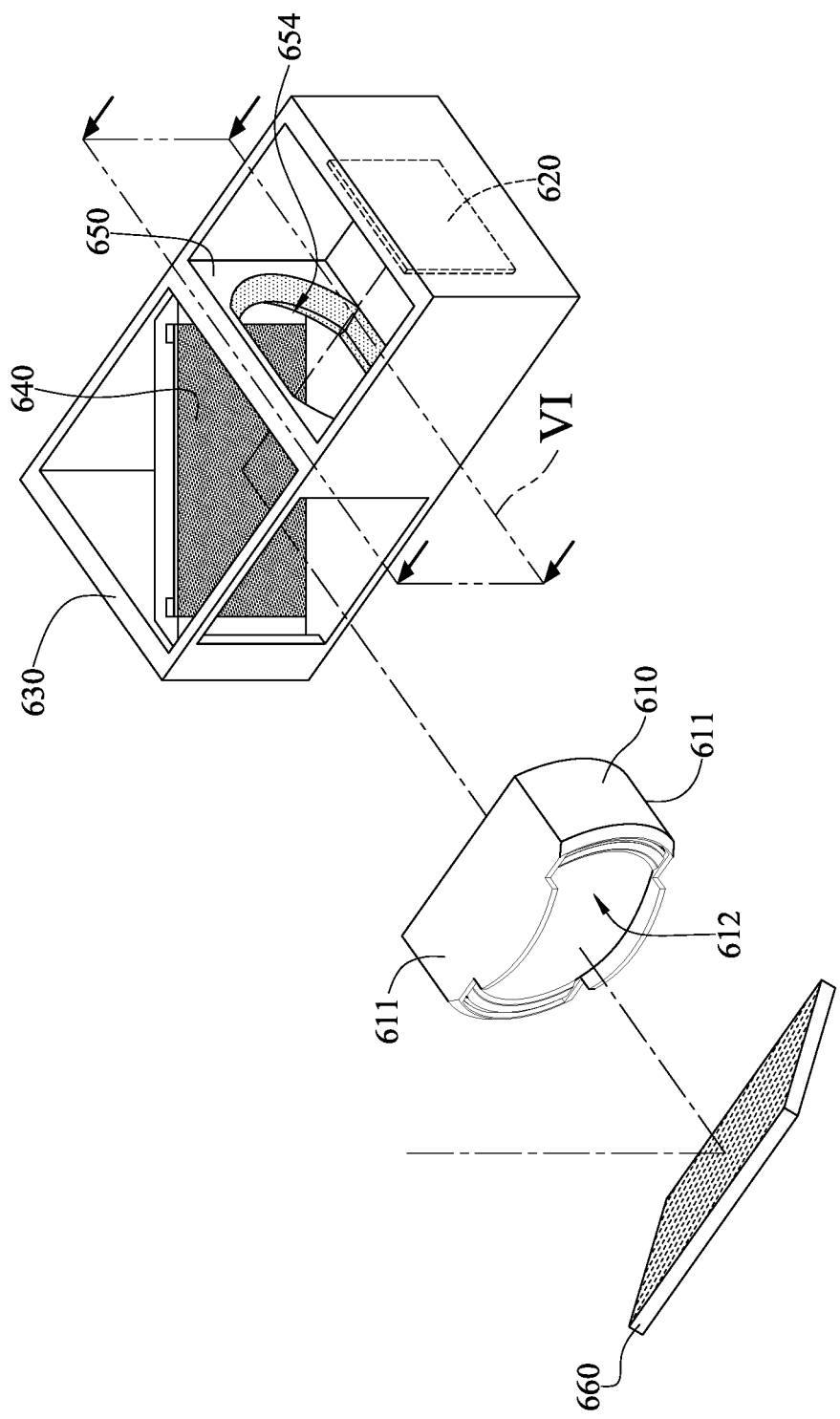
FIG. 20 is a perspective view of a camera module according to the 6th embodiment of the present disclosure.
Figure 21:
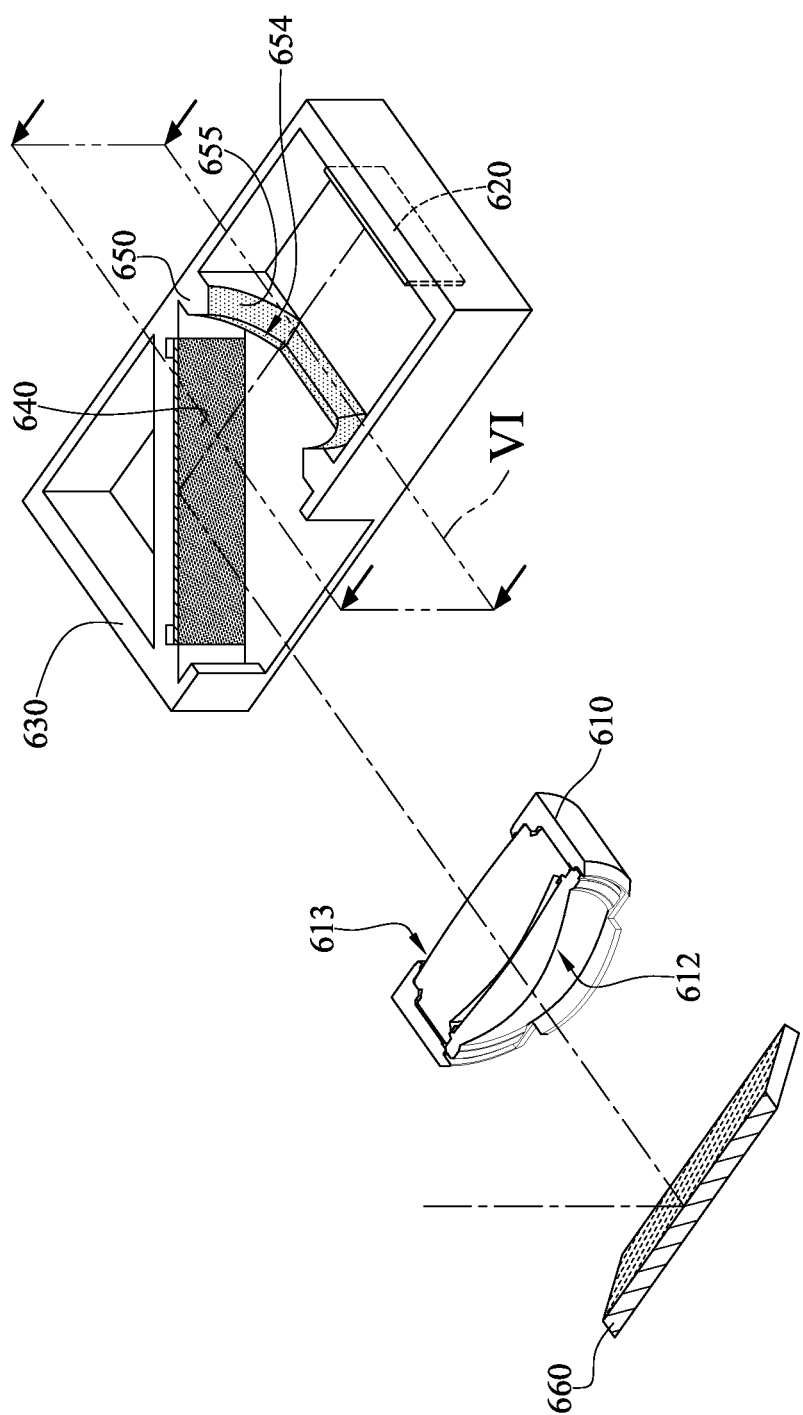
FIG. 21 is a cross-sectional view of the camera module in FIG. 20.
Figure 22:
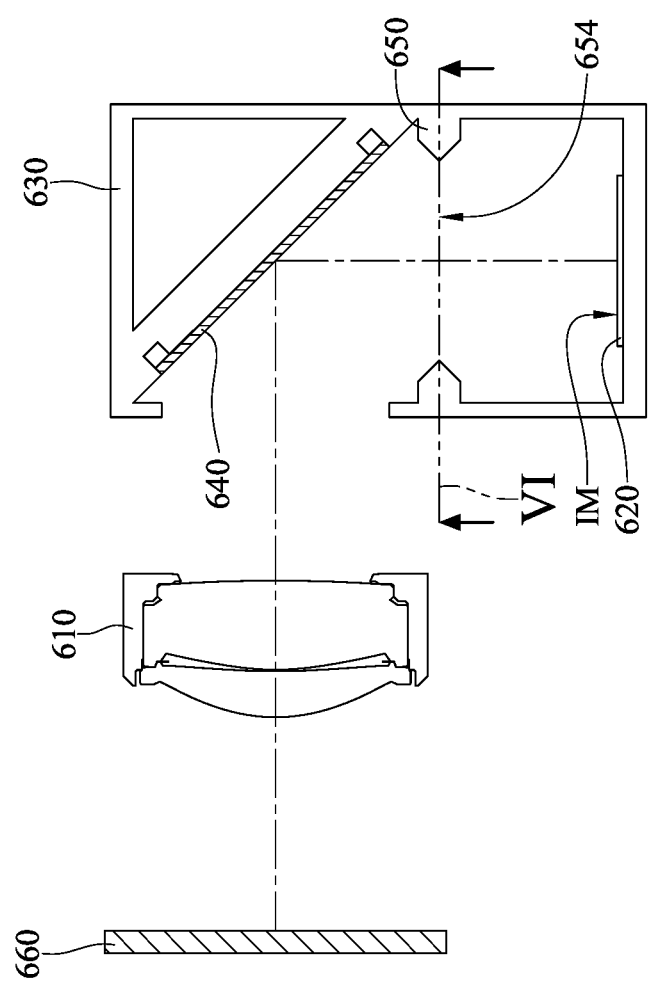
FIG. 22 is a top view of the camera module in FIG. 21.
Figure 23:
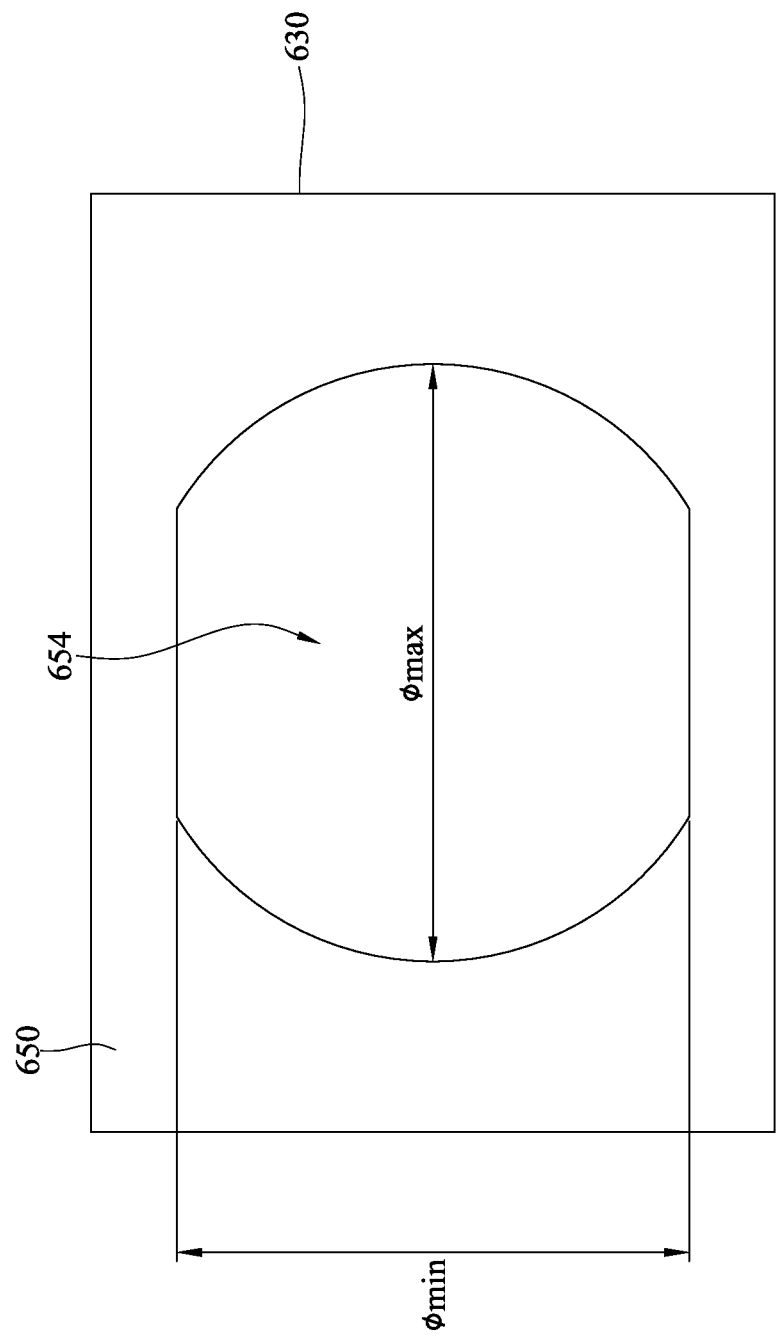
FIG. 23 is a cross-sectional view of a holding member in FIG. 20 along reference plane VI.

FIG. 20 is a perspective view of a camera module according to the 6th embodiment of the present disclosure. FIG. 21 is a cross-sectional view of the camera module in FIG. 20. FIG. 22 is a top view of the camera module in FIG. 21. FIG. 23 is a cross-sectional view of a holding member in FIG. 20 along reference plane VI. In this embodiment, the camera module (its reference numeral is omitted) includes an imaging lens system 610, an image sensor 620, a holding member 630, an image-side light-folding element 640, a light-shielding mechanism 650 and an object-side light-folding element 660.

The imaging lens system 610 is configured to focus imaging light onto the image surface IM, and the image sensor 620 is disposed on the image surface IM. In addition, the imaging lens system 610 has two trimmed structures 611 at a peripheral portion thereof. The trimmed structures 611 are on opposite sides of the peripheral portion, and each trimmed structure 611 is trimmed down from a periphery towards a center of the imaging lens system 610 to form a flat cutting surface. Moreover, the imaging lens system 610 has an object-side opening 612 and an image-side opening 613 being both non-circular.

The holding member 630 is disposed on an image side of the imaging lens system 610, and the image sensor 620 is disposed in the holding member 630.

The image-side light-folding element 640 is disposed on the image side of the imaging lens system 610, and the image-side light-folding element 640 is configured to fold the imaging light from an entrance optical path thereof to an exit optical path thereof. In addition, the image-side light-folding element 640 is disposed in the holding member 630, and the holding member 630 allows the imaging light to pass therethrough along the entrance optical path and the exit optical path of the image-side light-folding element 640. In this embodiment, the image-side light-folding element 640 is, for example, a reflection mirror, and the image-side light-folding element 640 is located between the imaging lens system 610 and the image surface IM in optical path. The exit optical path and the entrance optical path of the image-side light-folding element 640 are substantially perpendicular to each other.

The light-shielding mechanism 650 is disposed on the holding member 630, and the light-shielding mechanism 650 and the holding member 630 are one-piece formed. Furthermore, the light-shielding mechanism 650 is located between the image-side light-folding element 640 and the image surface IM. In addition, the light-shielding mechanism 650 has a minimal opening 654, and the minimal opening 654 is non-circular and surrounds the imaging light in the optical path where the light-shielding mechanism 650 is located. As shown in FIG. 23, there is an anti-reflective surface structure 655 arranged at a periphery of the minimal opening 654, and the anti-reflective surface structure 655 is a blackened surface which is formed by roughening a plastic surface.

The object-side light-folding element 660 is disposed on an object side of the imaging lens system 610, and the object-side light-folding element 660 is configured to fold the imaging light from an entrance optical path thereof to an exit optical path thereof. The entrance optical path of the object-side light-folding element 660 is substantially perpendicular to the exit optical path of the image-side light-folding element 640. In this embodiment, the object-side light-folding element 660 is, for example, a reflection mirror, and the exit optical path and the entrance optical path of the object-side light-folding element 660 are substantially perpendicular to each other.

When a maximum diameter of the minimal opening 654 is ϕmax, and a total path length from the imaging lens system 610 to the image sensor 620 is BFL, the following condition is satisfied: ϕmax/BFL=0.300.

When a focal length of the imaging lens system 610 is EFL, the following condition is satisfied: EFL=26.9 [mm].

When a minimum diameter of the minimal opening 654 is ϕmin, and the maximum diameter of the minimal opening 654 is ϕmax, the following condition is satisfied: ϕmin/ϕmax=0.857.

7th Embodiment

Figure 24:
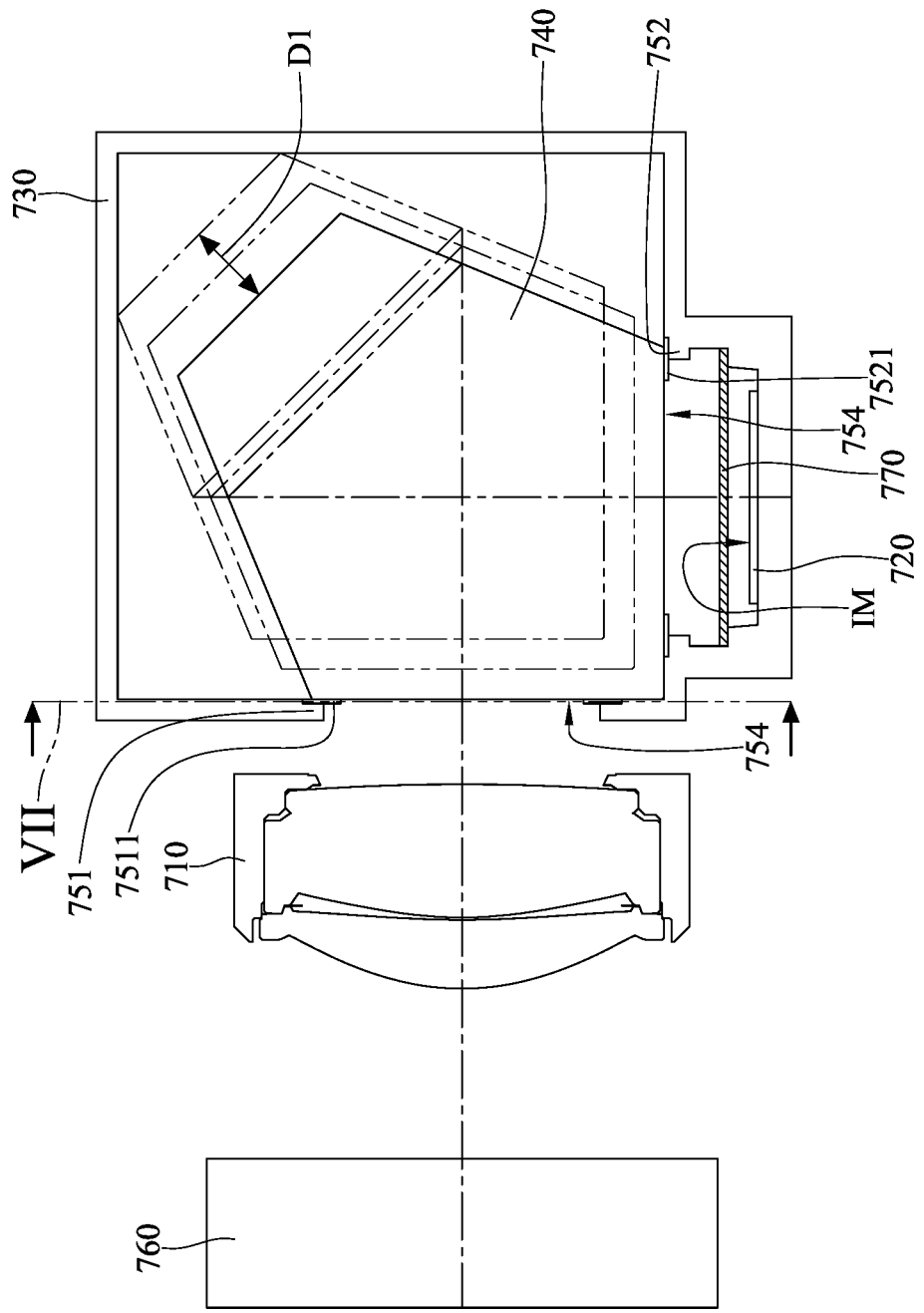
FIG. 24 is a cross-sectional and top view of an electronic device according to the 7th embodiment of the present disclosure.
Figure 25:
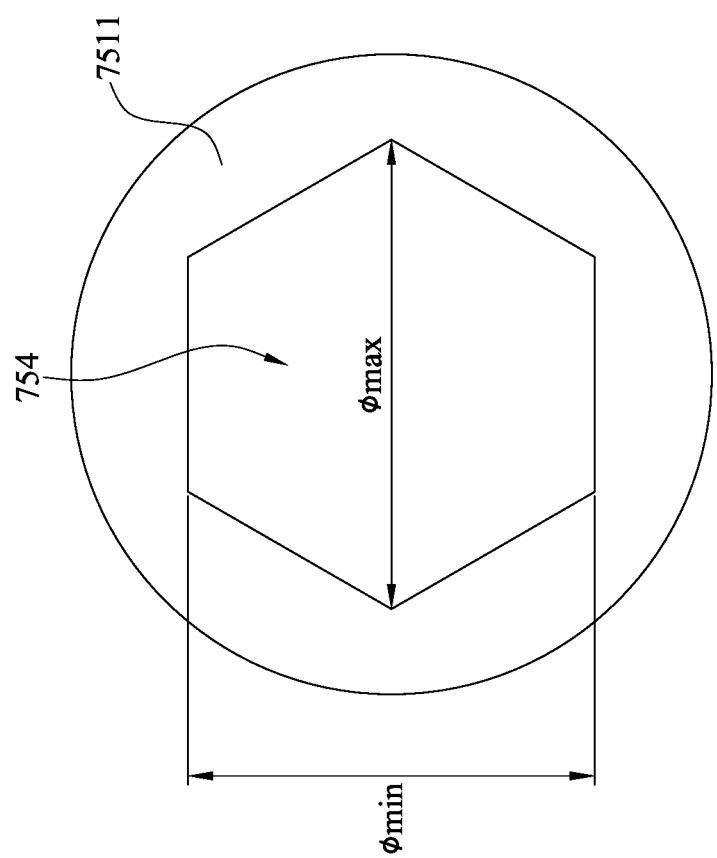
FIG. 25 is a cross-sectional view of a light-shielding member in FIG. 24 along reference plane VII.

FIG. 24 is a cross-sectional and top view of an electronic device according to the 7th embodiment of the present disclosure. FIG. 25 is a cross-sectional view of a light-shielding member in FIG. 24 along reference plane VII. In this embodiment, the electronic device (its reference numeral is omitted) includes the camera module (its reference numeral is omitted) and a driving unit (not shown in FIG. 24 or FIG. 25). The camera module includes an imaging lens system 710, an image sensor 720, a holding member 730, an image-side light-folding element 740, two light-shielding mechanisms 751 and 752, an object-side light-folding element 760 and an IR-cut filter 770.

The imaging lens system 710 is configured to focus imaging light onto the image surface IM, and the image sensor 720 is disposed on the image surface IM.

The holding member 730 is disposed on an image side of the imaging lens system 710, and the image sensor 720 is disposed in the holding member 730.

The image-side light-folding element 740 is disposed on the image side of the imaging lens system 710, and the image-side light-folding element 740 is configured to fold the imaging light from an entrance optical path thereof to an exit optical path thereof. In addition, the imaging light is reflected twice in the image-side light-folding element 740, and the exit optical path and the entrance optical path of the image-side light-folding element 740 are substantially perpendicular to each other. The image-side light-folding element 740 is disposed in the holding member 730, and the holding member 730 allows the imaging light to pass therethrough along the entrance optical path and the exit optical path of the image-side light-folding element 740. In this embodiment, the image-side light-folding element 740 is, for example, a pentaprism, and the image-side light-folding element 740 is located between the imaging lens system 710 and the image surface IM in optical path.

The light-shielding mechanisms 751 and 752 are disposed on the holding member 730, and the light-shielding mechanisms 751 and 752 are respectively located in the entrance optical path and the exit optical path of the image-side light-folding element 740. In addition, each of the light-shielding mechanisms 751 and 752 has a minimal opening 754, and the minimal openings 754 are non-circular and each surrounds the imaging light in the optical path where the light-shielding mechanisms 751 and 752 are located, respectively. Furthermore, the light-shielding mechanism 751 includes a light-shielding member 7511, the light-shielding mechanism 752 includes a light-shielding member 7521. The minimal openings 754 of the light-shielding mechanisms 751 and 752 are respectively located at the light-shielding members 7511 and 7521. The light-shielding member 7511 shown in FIG. 25 is only exemplary, and the light-shielding member 7521 in this embodiment can have a configuration the same as that of the light-shielding member 7511.

The object-side light-folding element 760 is disposed on an object side of the imaging lens system 710, and the object-side light-folding element 760 is configured to fold the imaging light from an entrance optical path thereof to an exit optical path thereof. The entrance optical path of the object-side light-folding element 760 is substantially perpendicular to the exit optical path of the image-side light-folding element 740. In this embodiment, the object-side light-folding element 760 is, for example, a triangular prism, and the exit optical path thereof is substantially perpendicular to the entrance optical path thereof.

The IR-cut filter 770 is disposed between the image-side light-folding element 740 and the image surface IM, and will not affect the focal length of the camera module. The IR-cut filter 770 is not in physical contact with any one of the light-shielding mechanisms 751 and 752, and the IR-cut filter 770 is closer to the image sensor 720 than the light-shielding mechanisms 751 and 752 are to the image sensor 720.

The driving unit is disposed on the camera module. The driving unit can drive the image-side light-folding element 740 to move in a bisector direction D1 of an angle between the entrance optical path and the exit optical path so as to achieve auto focusing. In one of various focusing conditions, the light-shielding members 7511 and 7521 are directly abutted with the image-side light-folding element 740.

When a maximum diameter of the minimal opening 754 is ϕmax, and a total path length from the imaging lens system 710 to the image sensor 720 is BFL, the following condition is satisfied: ϕmax/BFL=0.171.

When a focal length of the imaging lens system 710 is EFL, the following condition is satisfied: EFL=22.1 [mm].

When a minimum diameter of the minimal opening 754 is ϕmin, and the maximum diameter of the minimal opening 754 is ϕmax, the following condition is satisfied: ϕmin/ϕmax=0.865.

When a refractive index of the image-side light-folding element 740 is Nf, the following condition is satisfied: Nf=2.02.

8th Embodiment

Figure 26:
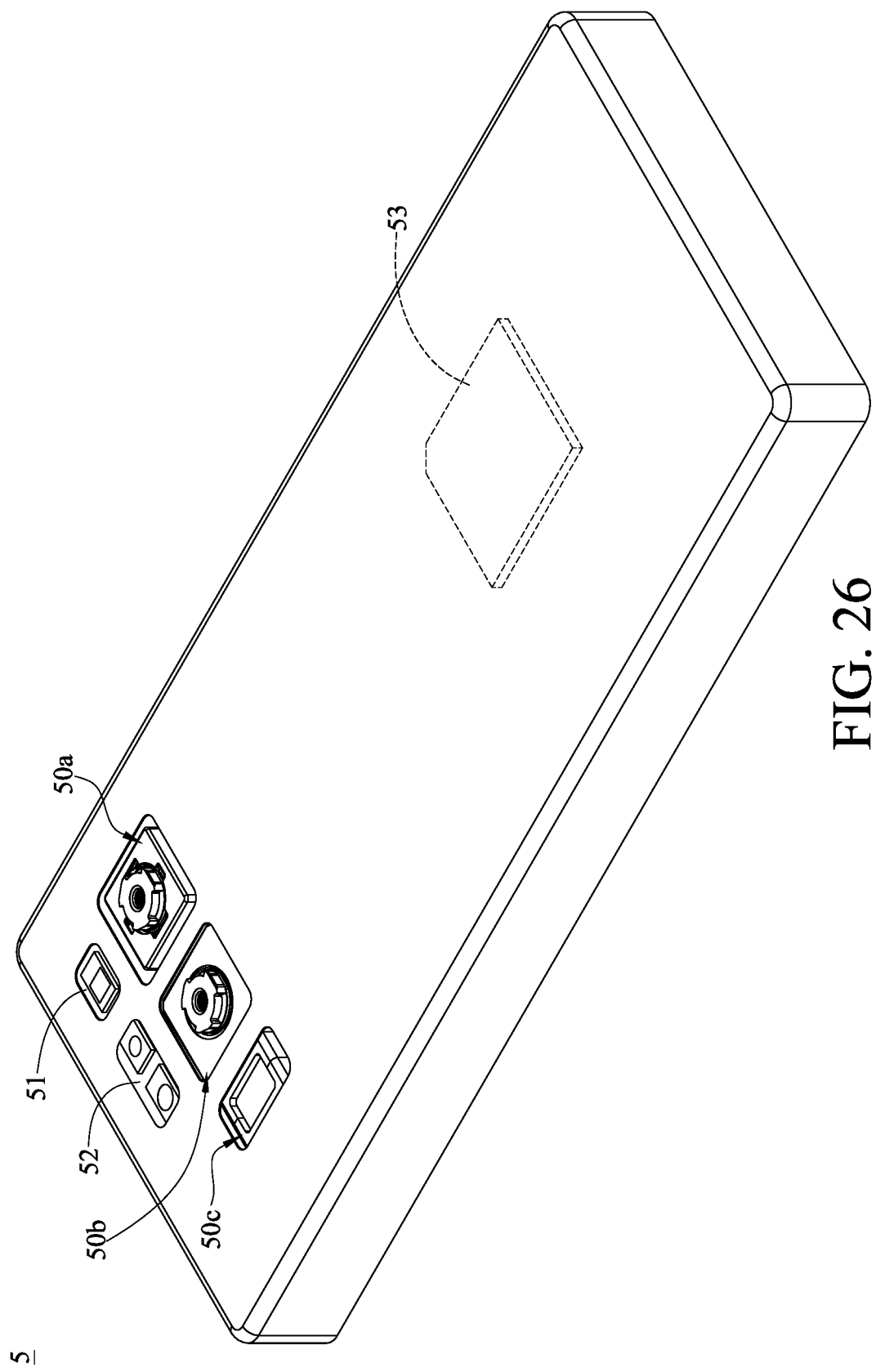
FIG. 26 is one perspective view of an electronic device according to the 8th embodiment of the present disclosure.
Figure 27:
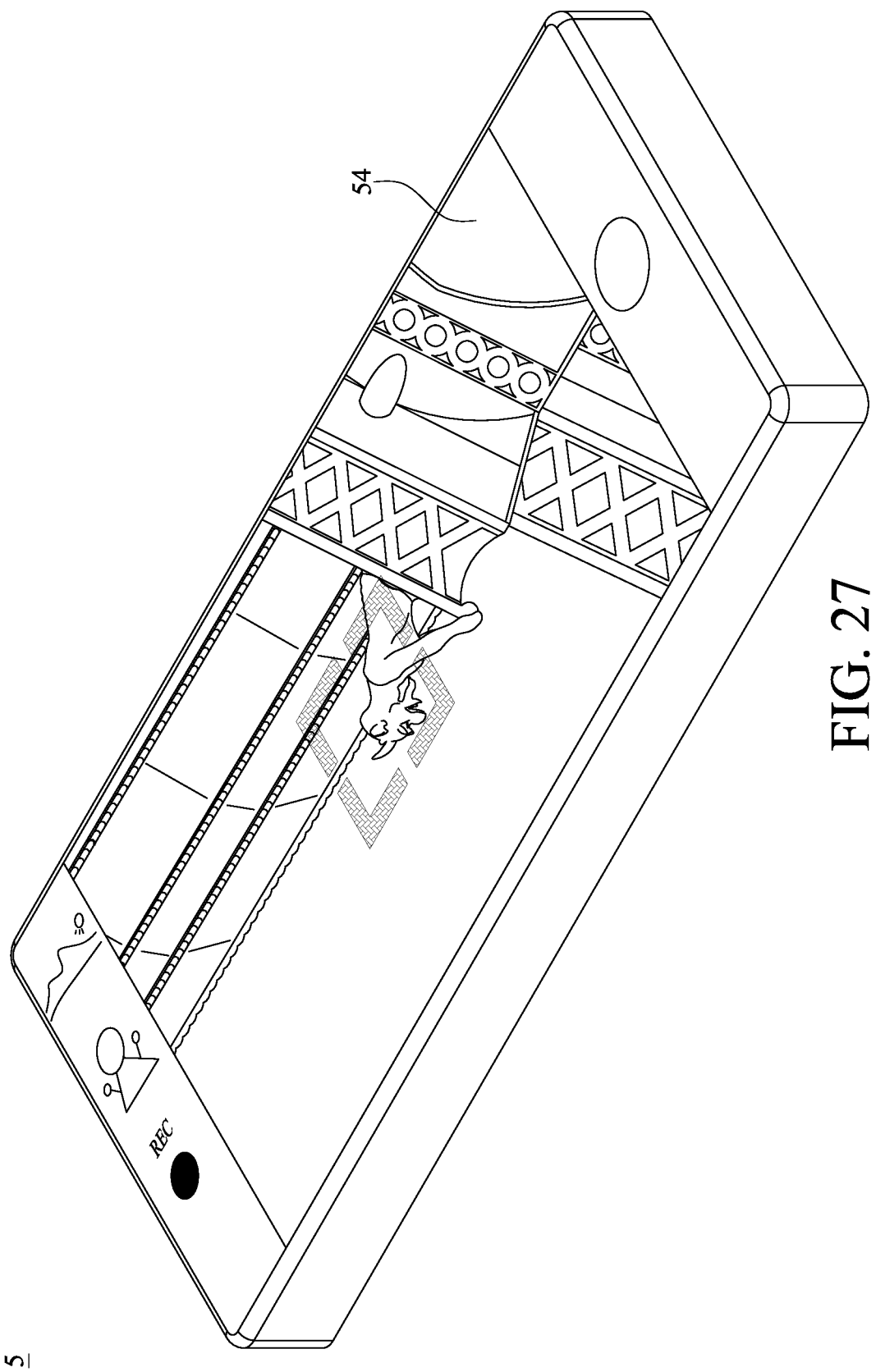
FIG. 27 is another perspective view of the electronic device in FIG. 26.

FIG. 26 is one perspective view of an electronic device according to the 8th embodiment of the present disclosure. FIG. 27 is another perspective view of the electronic device in FIG. 26.

In this embodiment, an electronic device 5 is a smartphone including a plurality of camera modules, a flash module 51, a focus assist module 52, an image signal processor 53, a user interface 54 and an image software processor.

The camera modules include an ultra wide angle camera module 50a, a high pixel camera module 50b and a telephoto camera module 50c. The camera module disclosed in the 1st embodiment is taken as the telephoto camera module 50c.

Figure 28:
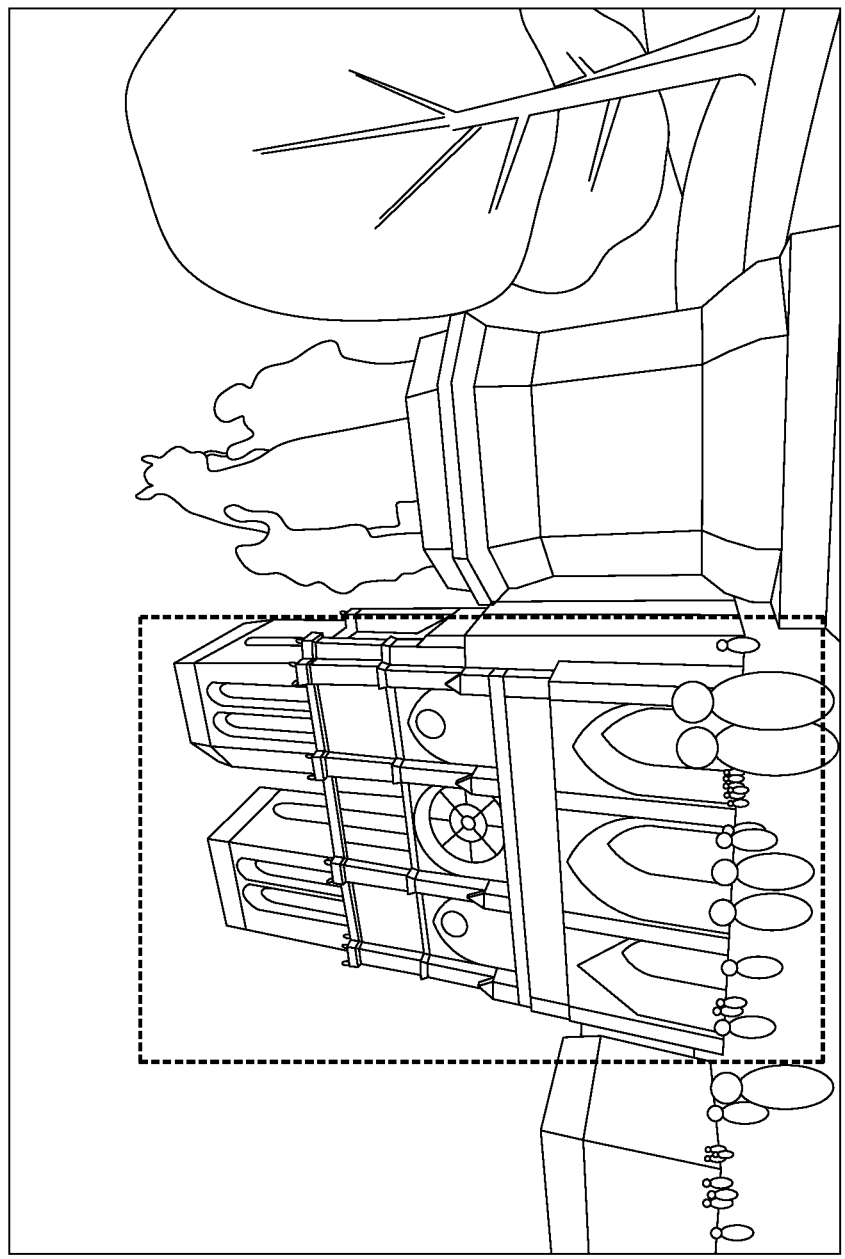
FIG. 28 is an image captured by an ultra wide angle camera module.

The image captured by the ultra wide angle camera module 50a enjoys a feature of multiple imaged objects. FIG. 28 is an image captured by an ultra wide angle camera module.

Figure 29:
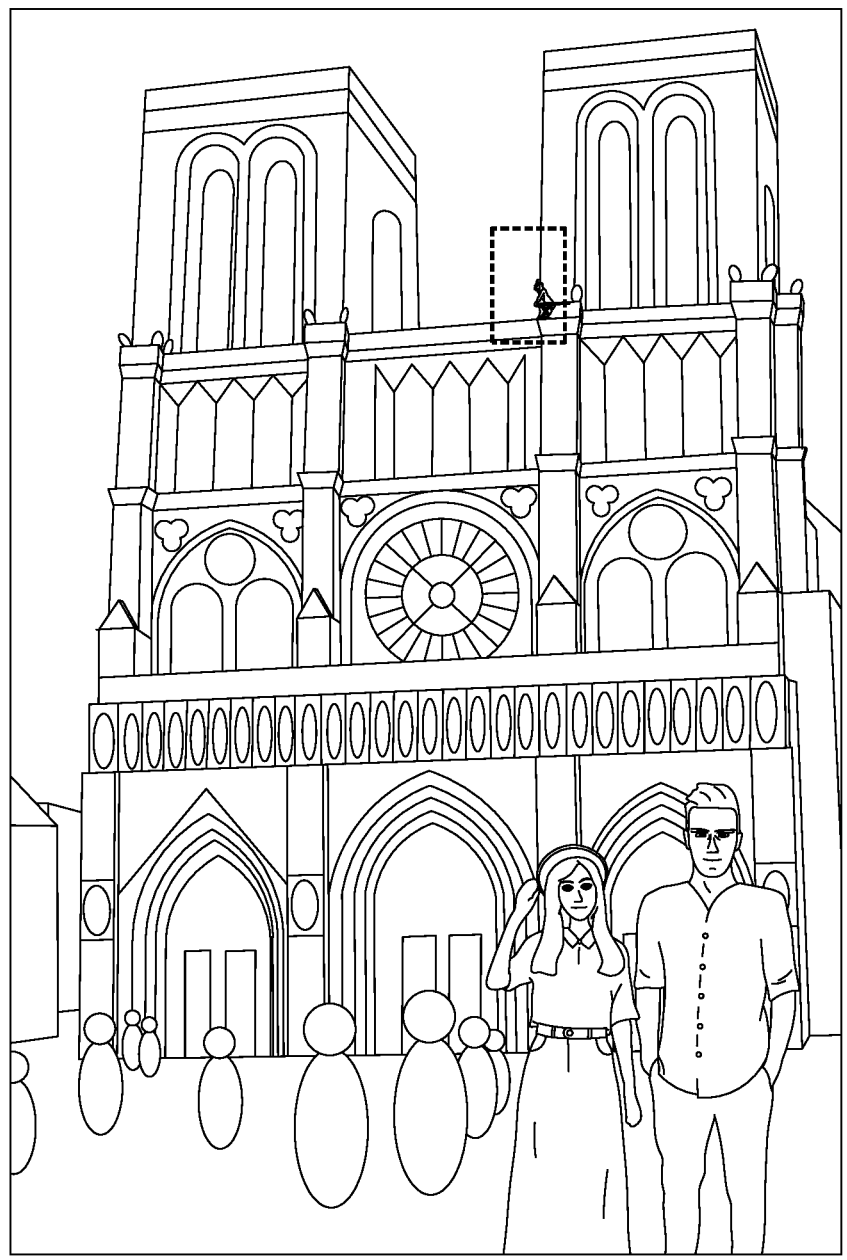
FIG. 29 is an image captured by a high pixel camera module.

The image captured by the high pixel camera module 50b enjoys a feature of high resolution and less distortion, and the high pixel camera module 50b can capture part of the image in FIG. 28. FIG. 29 is an image captured by a high pixel camera module.

Figure 30:
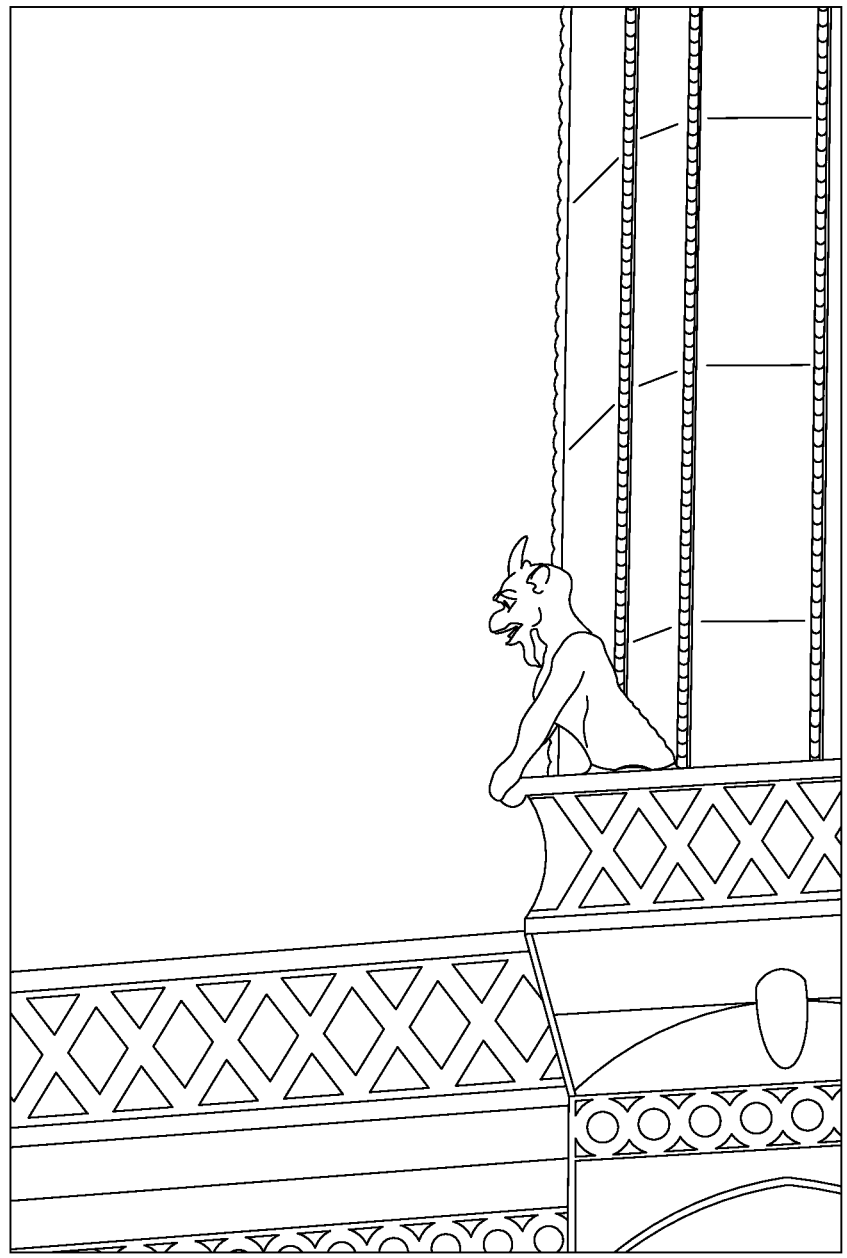
FIG. 30 is an image captured by a telephoto camera module.

The image captured by the telephoto camera module 50c enjoys a feature of high optical magnification, and the telephoto camera module 50c can capture part of the image in FIG. 29. FIG. 30 is an image captured by a telephoto camera module. The maximum field of view (FOV) of the camera module corresponds to the field of view in FIG. 30.

When a user captures images of an object, the light rays converge in the camera modules 50a, 50b or 50c to generate an image(s), and the flash module 51 is activated for light supplement. The focus assist module 52 detects the object distance of the imaged object to achieve fast auto focusing. The image signal processor 53 is configured to optimize the captured image to improve image quality and provided zooming function. The light beam emitted from the focus assist module 52 can be either conventional infrared or laser. The user interface 54 can be a touch screen or a physical button. The user is able to interact with the user interface 54 and the image software processor having multiple functions to capture images and complete image processing. The image processed by the image software processor can be displayed on the user interface 54.

The smartphone in this embodiment is only exemplary for showing the camera module of the present disclosure installed in an electronic device, and the present disclosure is not limited thereto. The camera module can be optionally applied to optical systems with a movable focus. Furthermore, the camera module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
   an imaging lens system, configured to focus an imaging light onto an image surface;
   an image sensor, disposed on the image surface; and
   a plurality of light-folding elements, comprising at least one image-side light-folding element disposed on an image side of the imaging lens system, wherein each of the plurality of light-folding elements has an entrance optical path and an exit optical path, and each of the plurality of light-folding elements is configured to fold the imaging light from the entrance optical path thereof to the exit optical path thereof;
   wherein at least one light-shielding mechanism is arranged on at least one of the entrance optical path and the exit optical path of the at least one image-side light-folding element, the at least one light-shielding mechanism has a minimal opening, and the minimal opening surrounds the imaging light in the at least one of the entrance optical path and the exit optical path of the at least one image-side light-folding element;
   wherein a maximum diameter of the minimal opening is $\Phi max$, a total path length from the imaging lens system to the image sensor is BFL, and the following condition is satisfied:

$0.14 < \Phi max/BFL < 0.42$.

2. The camera module of claim 1, wherein the plurality of light-folding elements comprises at least two image-side light-folding elements disposed on the image side of the imaging lens system, the at least one light-shielding mechanism is located between the at least two image-side light-folding elements, and the at least one light-shielding mechanism forms a gap between the at least two image-side light-folding elements.

3. The camera module of claim 2, wherein the plurality of light-folding elements further comprises an object-side light-folding element disposed on an object side of the imaging lens system, and the entrance optical path of the object-side light-folding element is substantially perpendicular to the exit optical path of any one of the at least two image-side light-folding elements.

4. The camera module of claim 1, wherein the imaging lens system has at least two trimmed structures at a peripheral portion thereof, each of the trimmed structures is trimmed down from a periphery towards a center of the imaging lens system, and the at least two trimmed structures are on opposite sides of the peripheral portion.

5. The camera module of claim 1, wherein the at least one image-side light-folding element is disposed in a holding member, the holding member allows the imaging light to pass therethrough along the entrance optical path and the exit optical path of the at least one image-side light-folding element, and the at least one light-shielding mechanism is disposed on the holding member.

6. The camera module of claim 5, wherein the at least one light-shielding mechanism and the holding member are one-piece formed, and the at least one light-shielding mechanism has an anti-reflective surface structure at a periphery of the minimal opening.

7. The camera module of claim 5, wherein the at least one light-shielding mechanism comprises at least one light-shielding member, and a light-absorbing layer is arranged on the at least one light-shielding member.

8. The camera module of claim 1, wherein the maximum diameter of the minimal opening is $\Phi max$, the total path length from the imaging lens system to the image sensor is BFL, and the following condition is satisfied:

$0.14 < \Phi max/BFL < 0.35$.

9. The camera module of claim 1, wherein the minimal opening is non-circular, a minimum diameter of the minimal opening is $\Phi min$, the maximum diameter of the minimal opening is $\Phi max$, and the following condition is satisfied:

$0.55 < \Phi min/\Phi max < 0.95$.

10. A camera module, comprising:
    an imaging lens system, configured to focus an imaging light onto an image surface;
    an image sensor, disposed on the image surface; and
    at least one light-folding element, disposed on an image side of the imaging lens system, wherein the at least one light-folding element has an entrance optical path and an exit optical path, and the at least one light-folding element is configured to fold the imaging light from the entrance optical path thereof to the exit optical path thereof;
    wherein at least one light-shielding mechanism is arranged on at least one of the entrance optical path and the exit optical path of the at least one light-folding element, the at least one light-shielding mechanism has a minimal opening, and the minimal opening surrounds the imaging light in the at least one of the entrance optical path and the exit optical path of the at least one light-folding element;
    wherein the at least one light-folding element is disposed in a holding member, the holding member allows the imaging light to pass therethrough along the entrance optical path and the exit optical path of the at least one light-folding element, the at least one light-shielding mechanism is disposed on the holding member, the at least one light-shielding mechanism and the holding member are one-piece formed, and the at least one light-shielding mechanism has an anti-reflective surface structure at a periphery of the minimal opening;
wherein a focal length of the imaging lens system is EFL, and the following condition is satisfied:

15 [mm]<$EFL$<40 [mm].

11. The camera module of claim 10, wherein the focal length of the imaging lens system is EFL, and the following condition is satisfied:

20 [mm]<$EFL$<35 [mm].

12. The camera module of claim 10, wherein the number of the at least one light-folding element is plural, at least two of the light-folding elements are disposed on the image side of the imaging lens system, at least one of the at least two light-folding elements is disposed in the holding member, and the at least one light-shielding mechanism is located between the at least two light-folding elements.

13. The camera module of claim 10, further comprising an IR-cut filter, wherein the at least one light-shielding mechanism and the IR-cut filter are not in physical contact with each other.

14. The camera module of claim 10, wherein the imaging lens system has an object-side opening and an image-side opening being both non-circular.

15. The camera module of claim 10, wherein a refractive index of the at least one light-folding element is Nf, and the following condition is satisfied:

1.7≤$Nf$.

16. An electronic device, comprising the camera module of claim 10 and a driving unit, wherein the driving unit is disposed on the camera module.

17. A camera module, comprising:
an imaging lens system, configured to focus an imaging light onto an image surface;
an image sensor, disposed on the image surface; and
at least two light-folding elements, disposed on an image side of the imaging lens system, wherein each of the at least two light-folding elements has an entrance optical path and an exit optical path, and each of the at least two light-folding elements is configured to fold the imaging light from the entrance optical path thereof to the exit optical path thereof;
wherein at least one light-shielding mechanism is arranged on at least one of the entrance optical path and the exit optical path of each of the at least two light-folding elements, the at least one light-shielding mechanism has a minimal opening, and the minimal opening surrounds the imaging light in the at least one of the entrance optical path and the exit optical path of each of the at least two light-folding elements;
wherein at least one of the at least two light-folding elements is disposed in a holding member, the holding member allows the imaging light to pass therethrough along the entrance optical path and the exit optical path of the at least one of the at least two light-folding elements, the at least one light-shielding mechanism is disposed on the holding member, and the at least one light-shielding mechanism is located between the at least two light-folding elements;
wherein a focal length of the imaging lens system is EFL, and the following condition is satisfied:

15 [mm]<$EFL$<40 [mm].

18. The camera module of claim 17, wherein the focal length of the imaging lens system is EFL, and the following condition is satisfied:

20 [mm]<$EFL$<35 [mm].

19. The camera module of claim 17, wherein a light-shielding mechanism is arranged on each of the entrance optical path and the exit optical path of one of the at least two light-folding elements.

20. The camera module of claim 17, wherein the at least one light-shielding mechanism comprises at least one light-shielding member, and a light-absorbing layer is arranged on the at least one light-shielding member.

21. The camera module of claim 17, further comprising an IR-cut filter, wherein the at least one light-shielding mechanism and the IR-cut filter are not in physical contact with each other.

22. The camera module of claim 17, wherein the imaging lens system has an object-side opening and an image-side opening being both non-circular.

23. The camera module of claim 17, wherein a refractive index of each of the at least two light-folding elements is Nf, and the following condition is satisfied:

1.7≤$Nf$.

24. An electronic device, comprising the camera module of claim 17 and a driving unit, wherein the driving unit is disposed on the camera module.

* * * * *